Nov. 24, 1936.   J. W. BRYCE ET AL   2,062,117
RECORD CONTROLLED ACCOUNTING MACHINE
Filed Aug. 1, 1931   23 Sheets-Sheet 1

INVENTORS
BY their ATTORNEYS

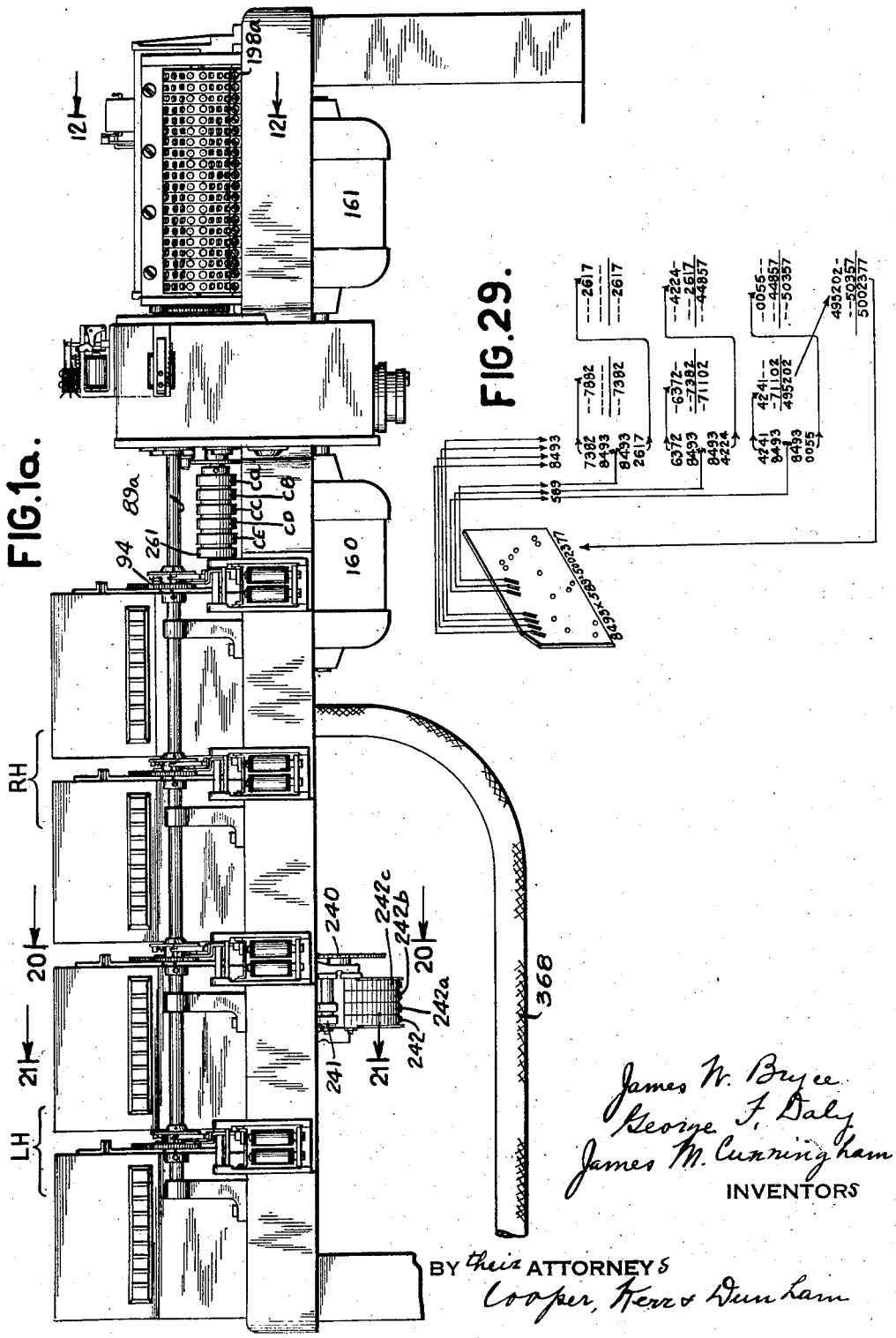

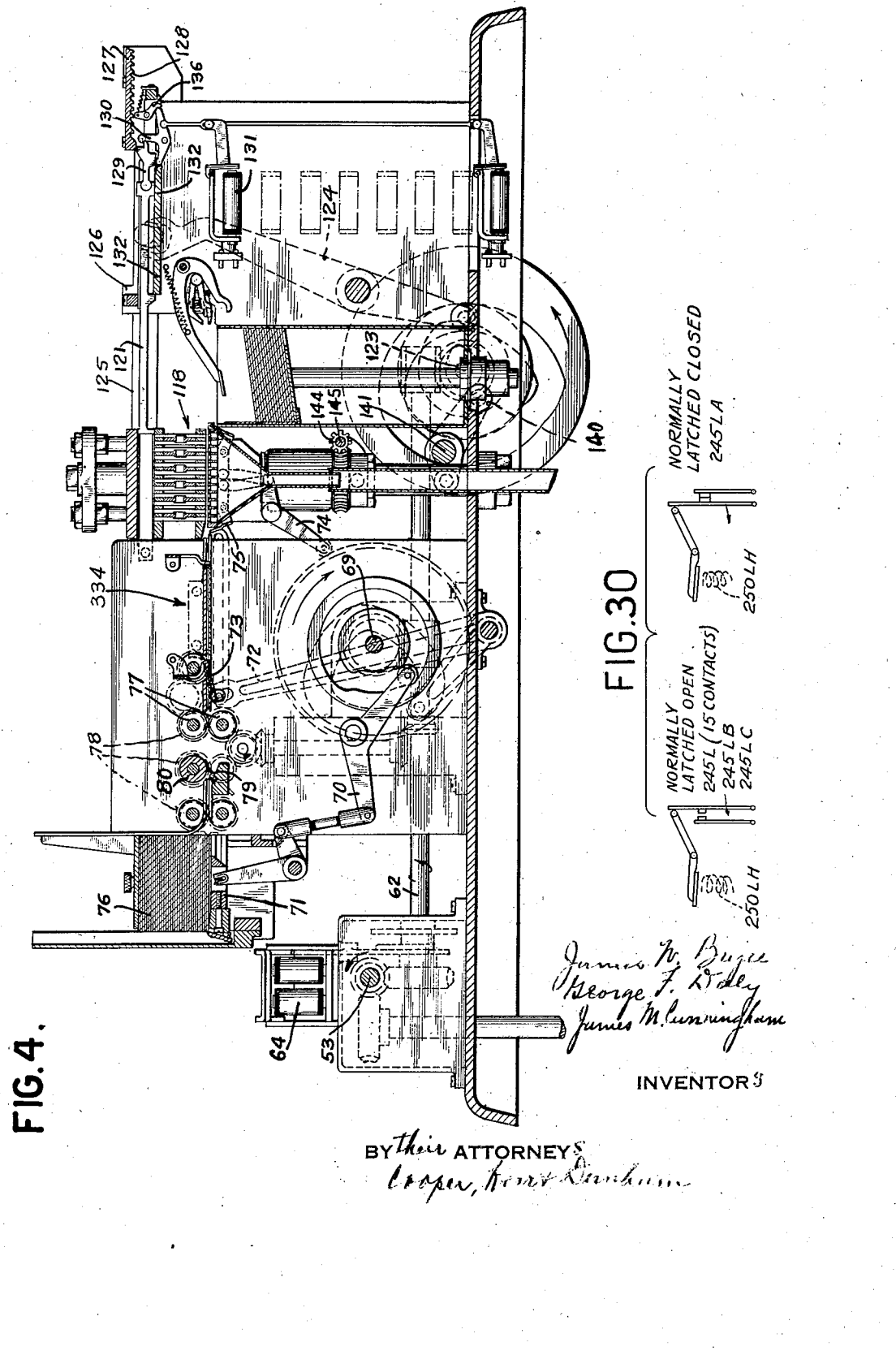

Nov. 24, 1936.    J. W. BRYCE ET AL    2,062,117
RECORD CONTROLLED ACCOUNTING MACHINE
Filed Aug. 1, 1931    23 Sheets-Sheet 5
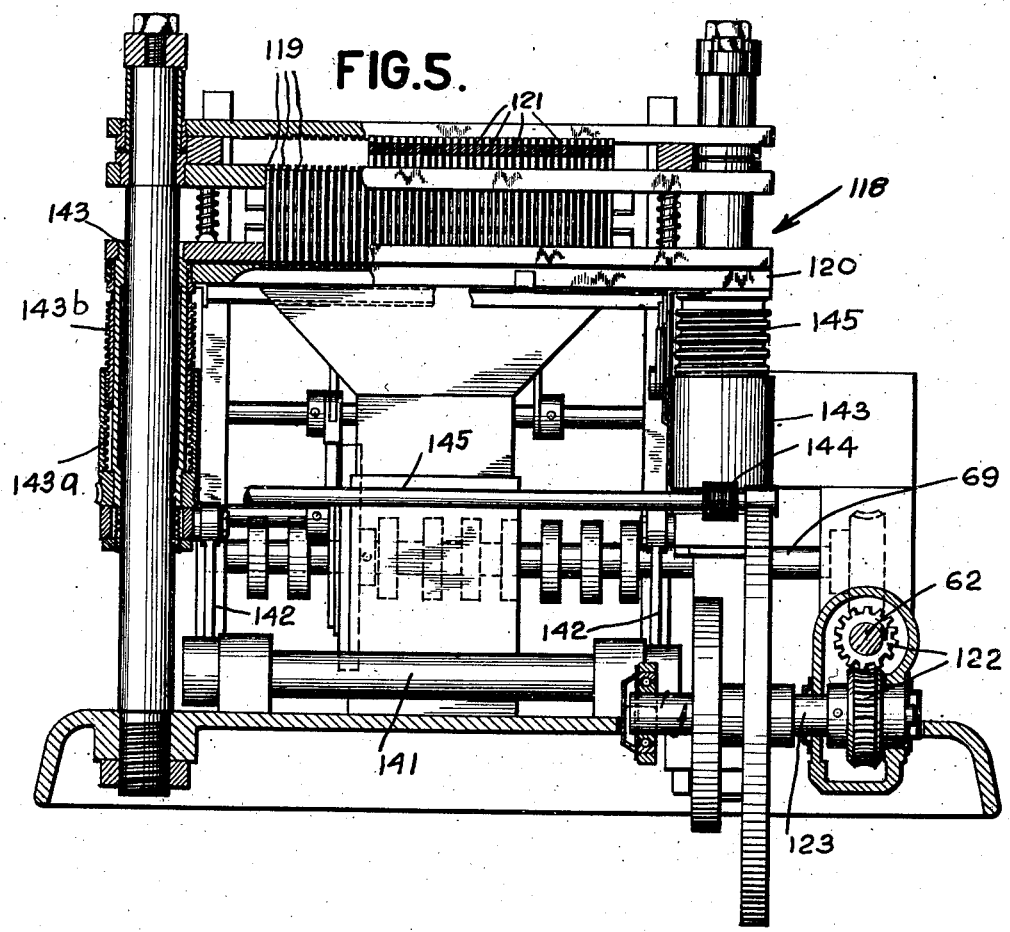
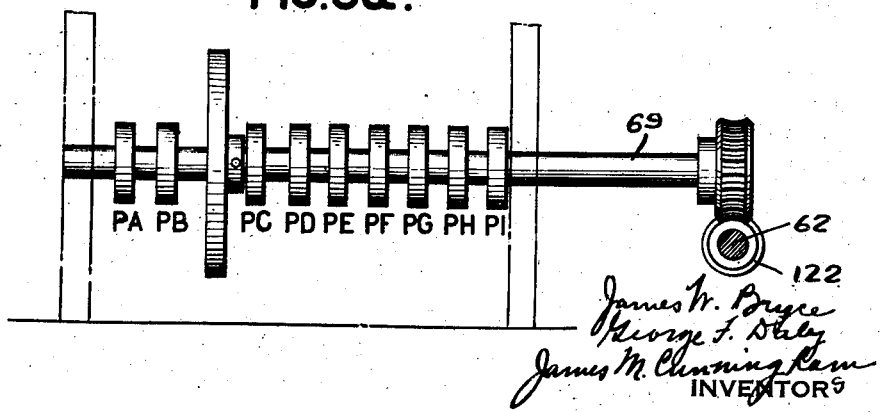

Nov. 24, 1936.   J. W. BRYCE ET AL   2,062,117
RECORD CONTROLLED ACCOUNTING MACHINE
Filed Aug. 1, 1931   23 Sheets-Sheet 6
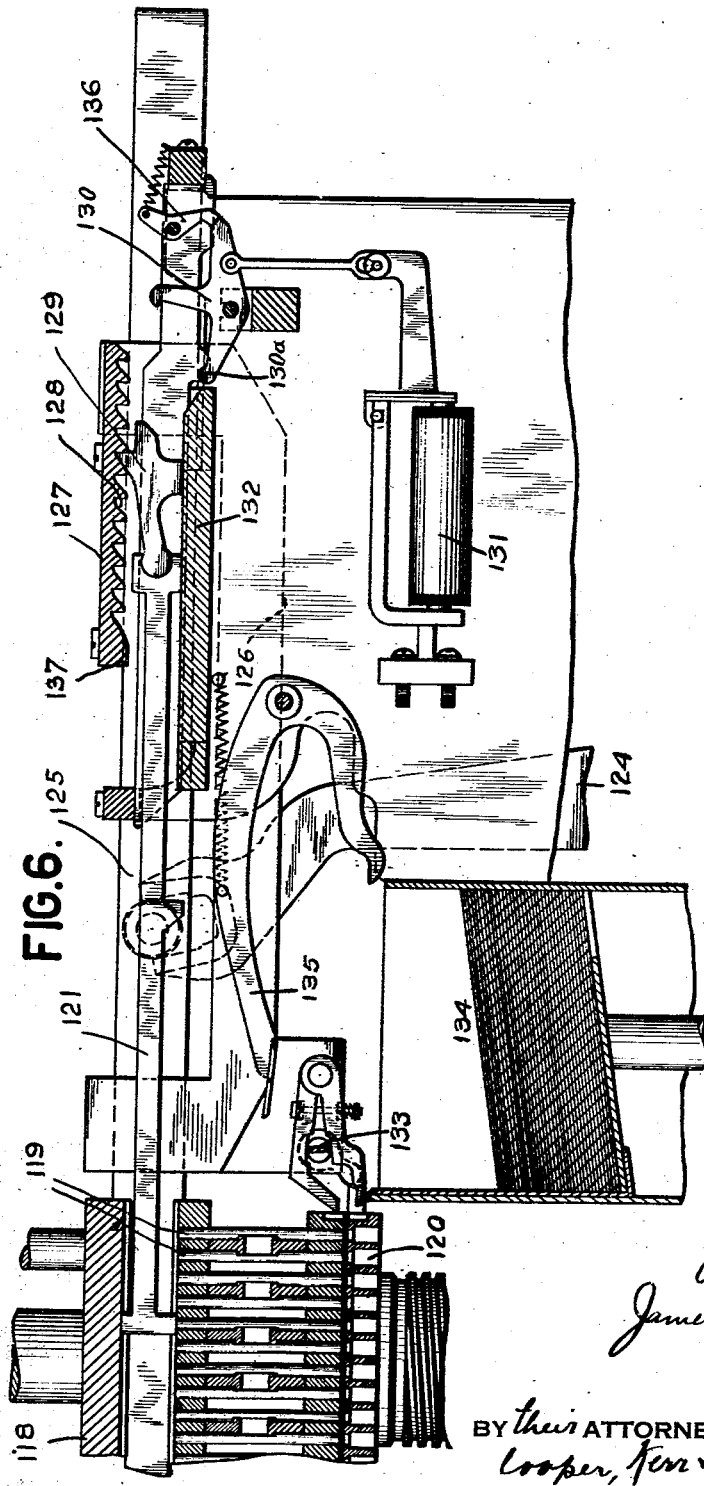
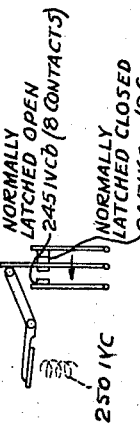
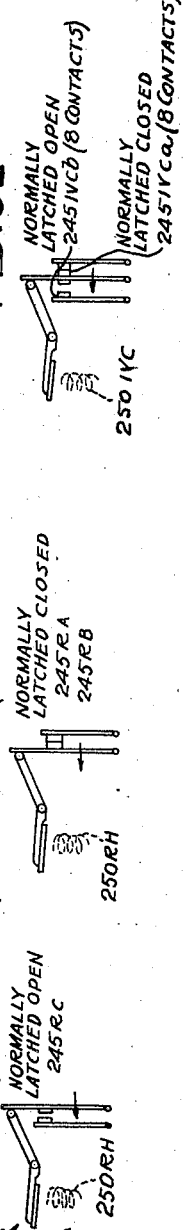

James W. Bryce
George F. Daly
James M. Cunningham
INVENTORS

BY their ATTORNEYS
Cooper, Kerr & Dunham

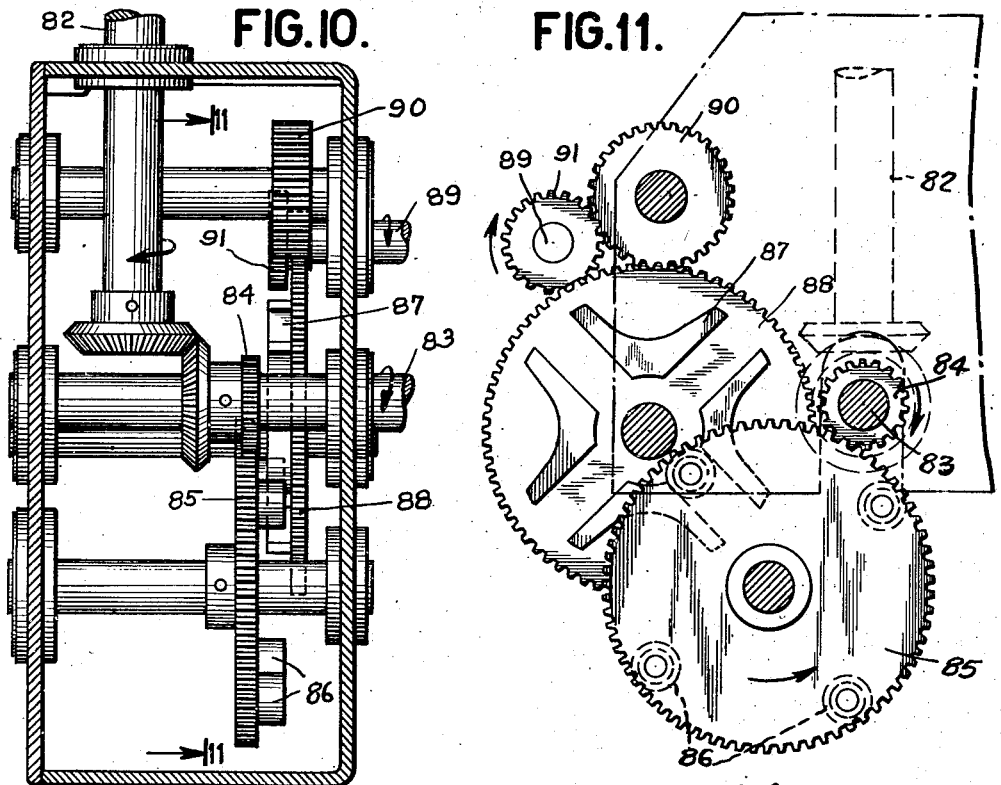
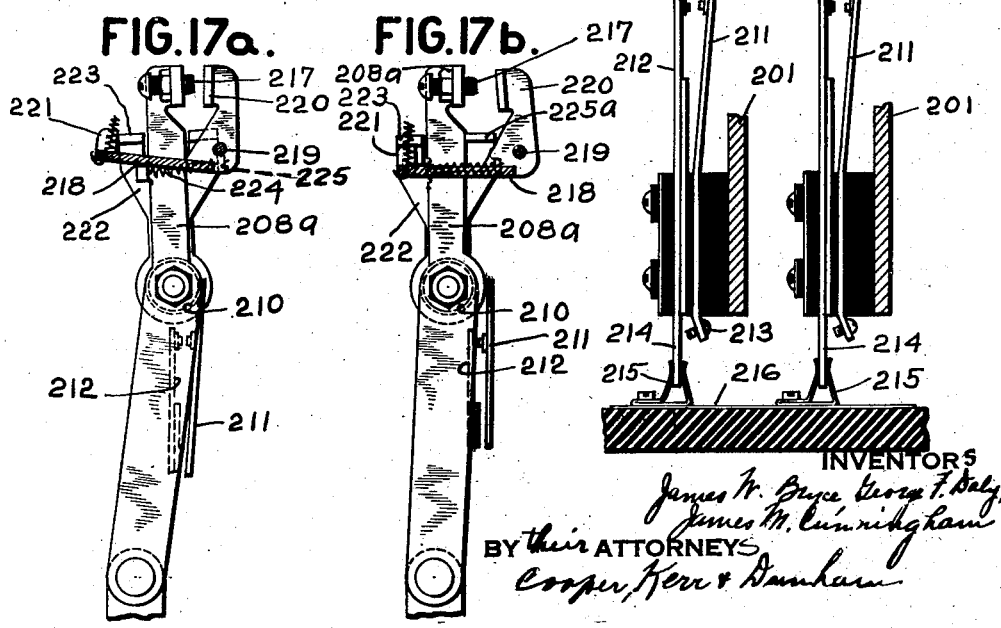

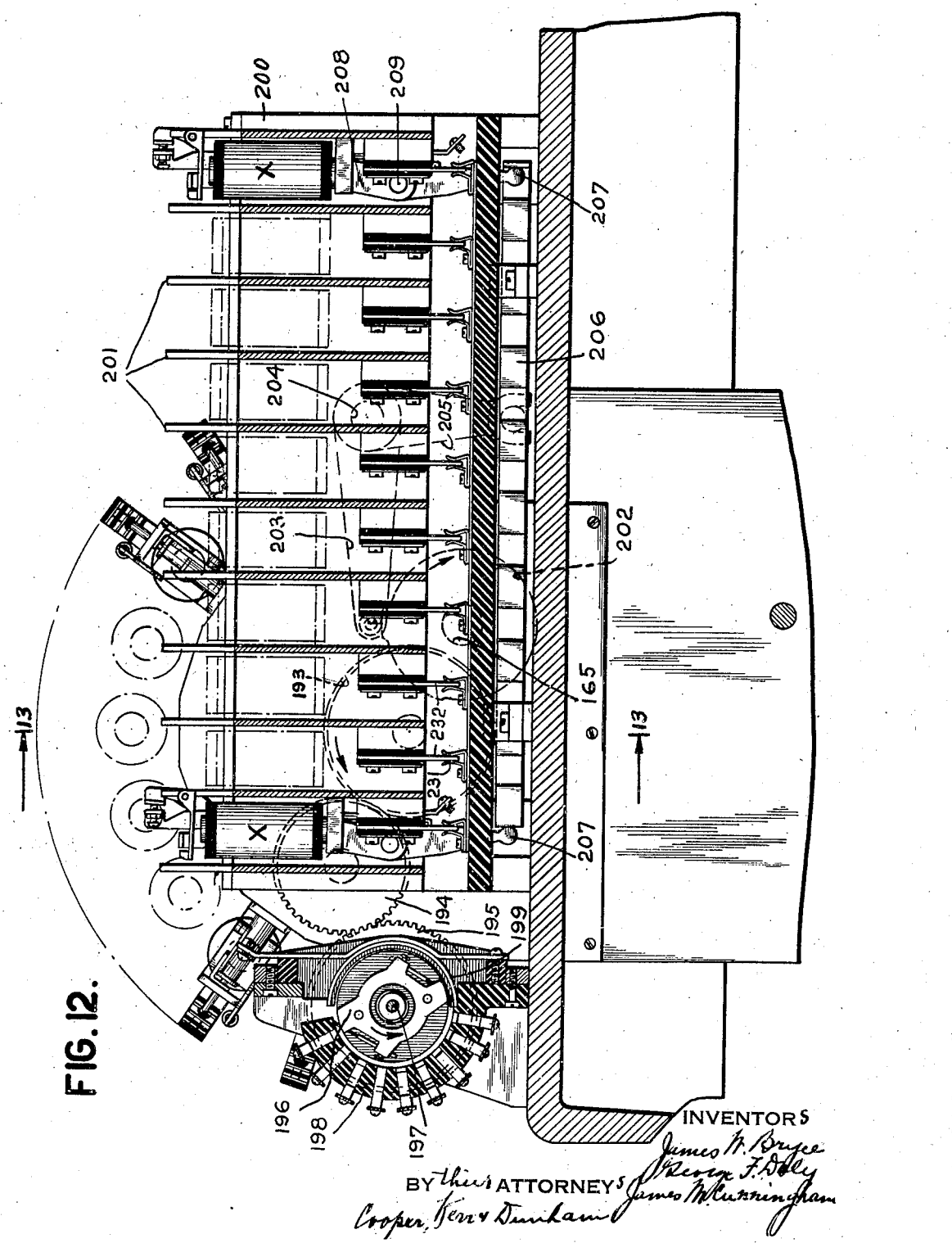

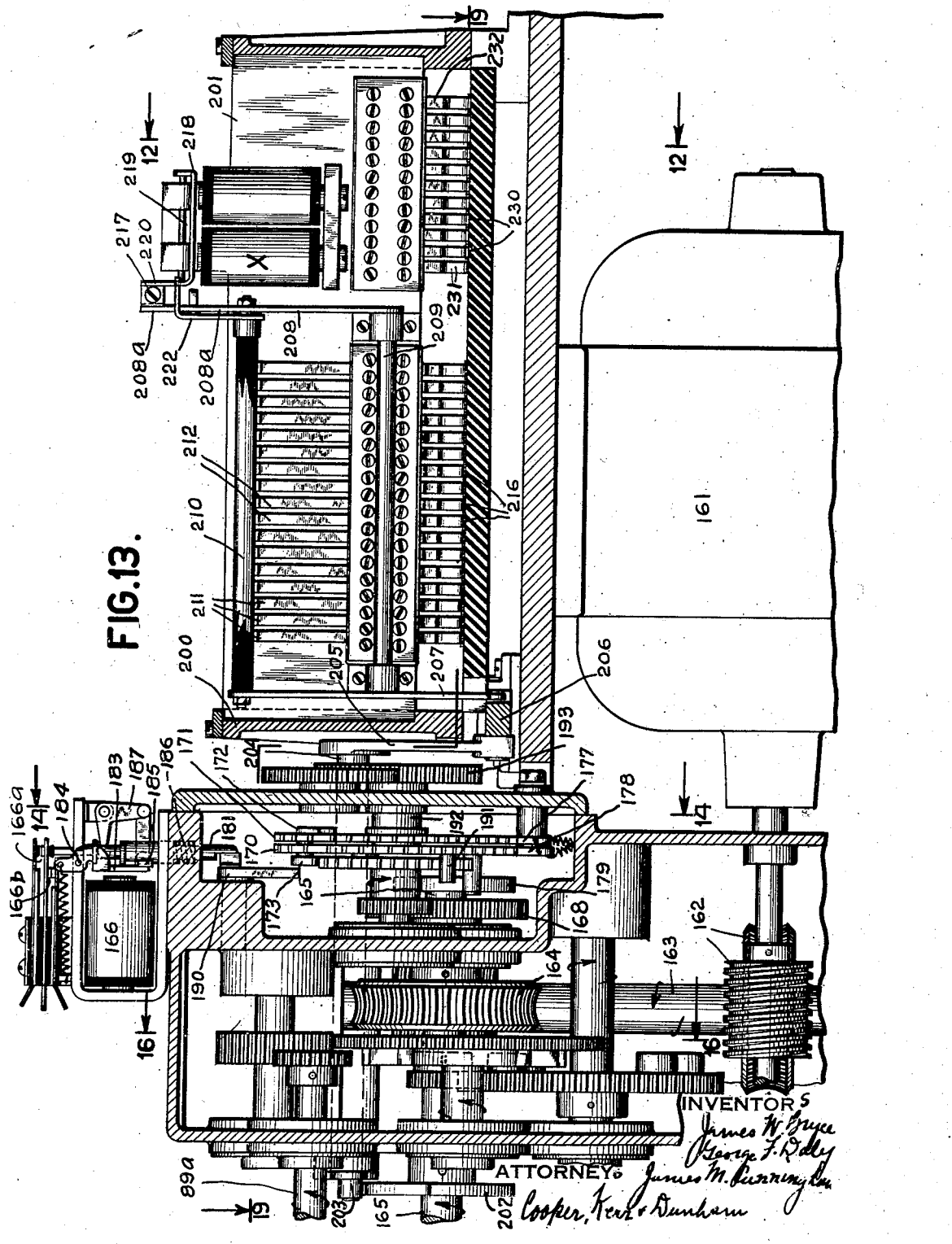

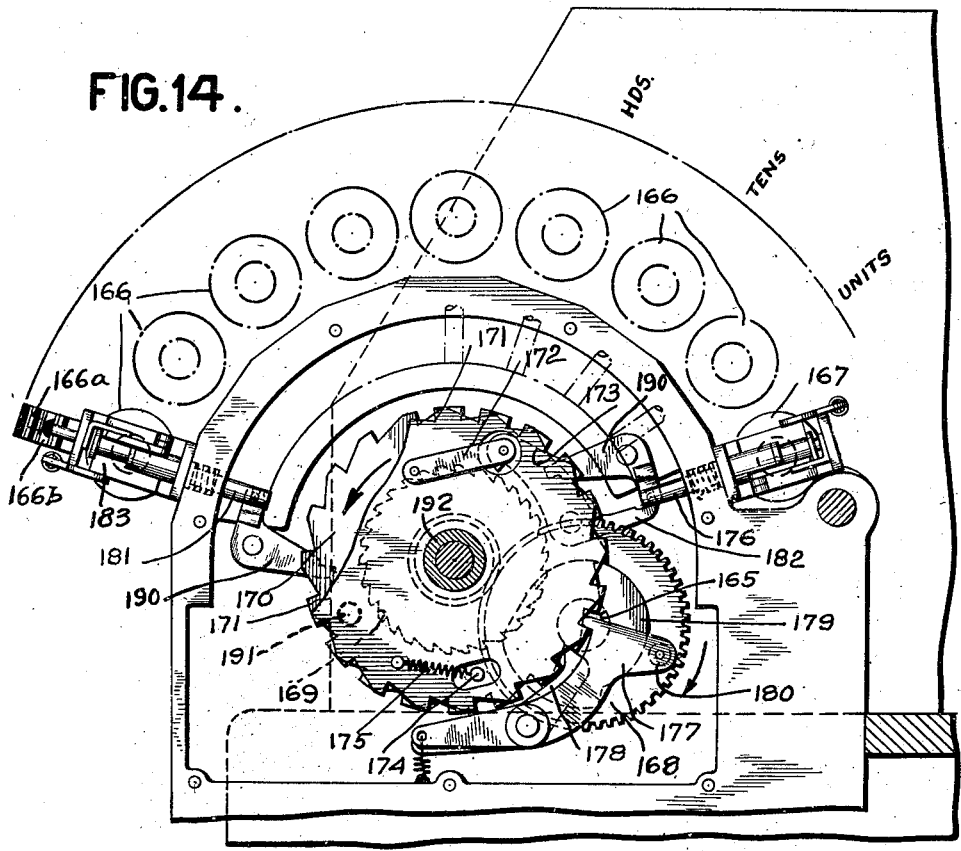
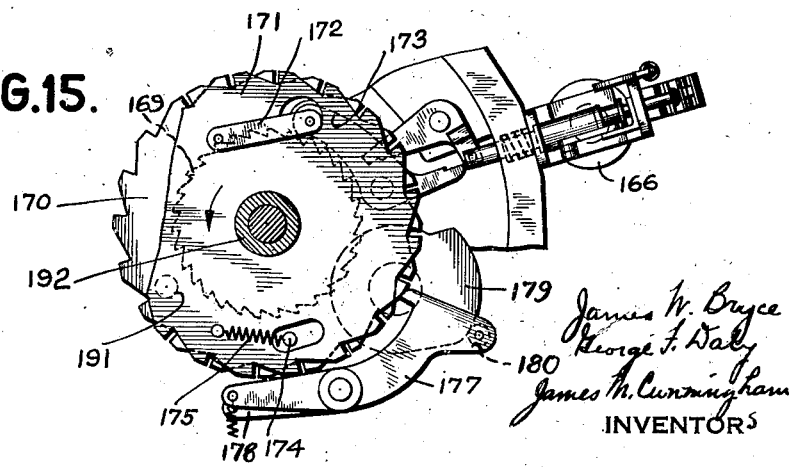

Nov. 24, 1936.    J. W. BRYCE ET AL    2,062,117
RECORD CONTROLLED ACCOUNTING MACHINE
Filed Aug. 1, 1931    23 Sheets-Sheet 12

James W. Bryce
George F. Daly
James M. Cunningham
INVENTORS

BY their ATTORNEYS
Cooper, Kerr & Dunham

Nov. 24, 1936.  J. W. BRYCE ET AL  2,062,117
RECORD CONTROLLED ACCOUNTING MACHINE
Filed Aug. 1, 1931  23 Sheets-Sheet 15

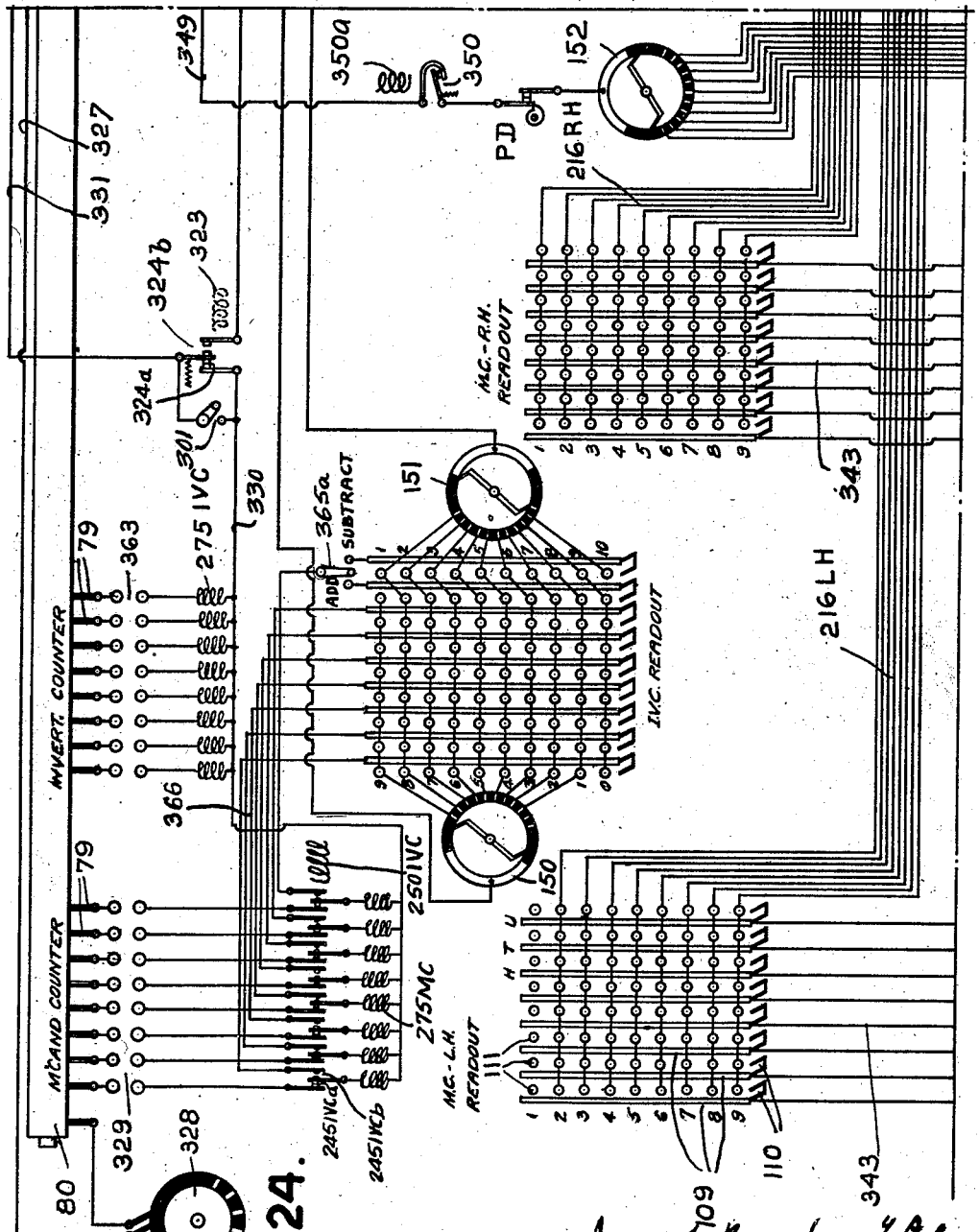

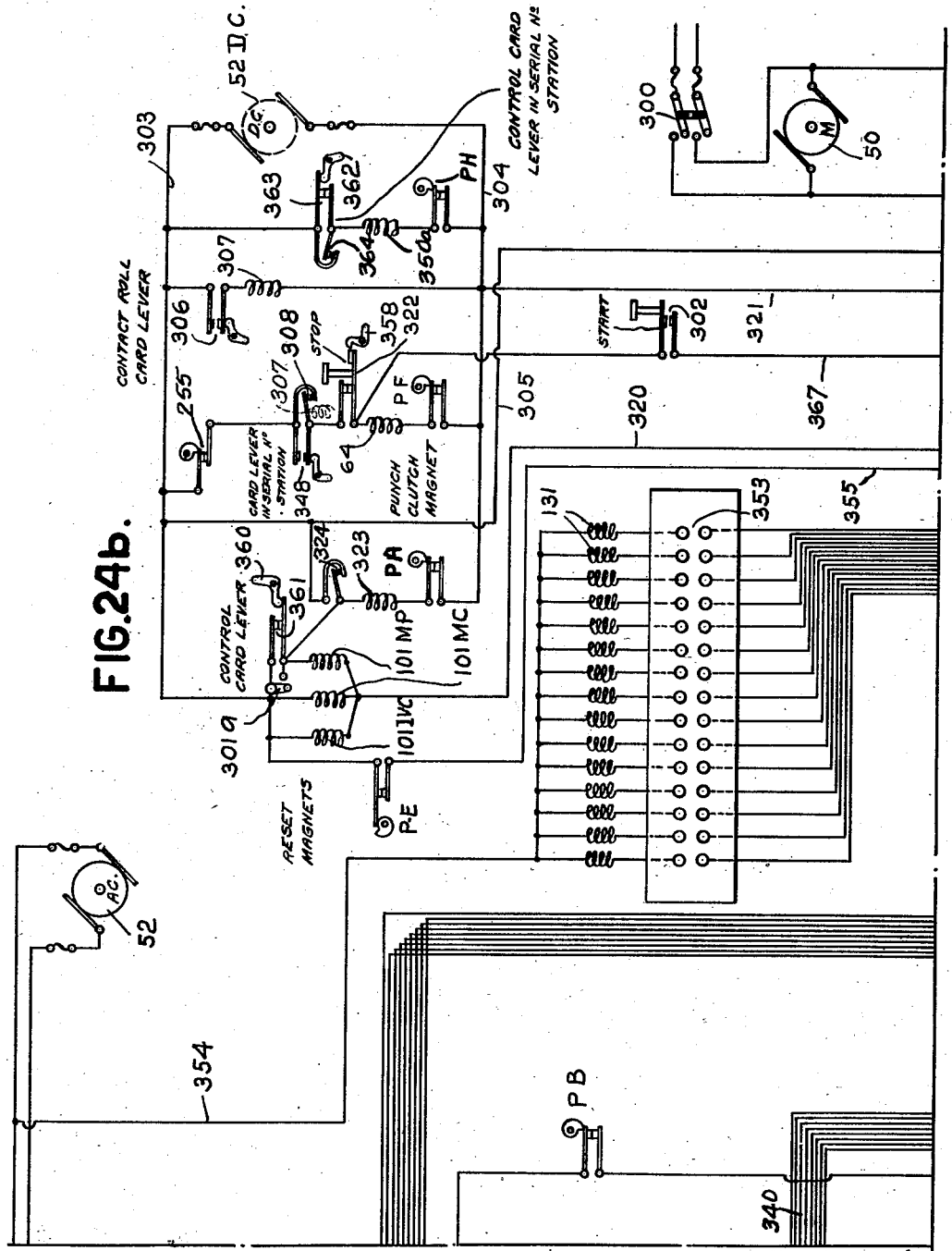

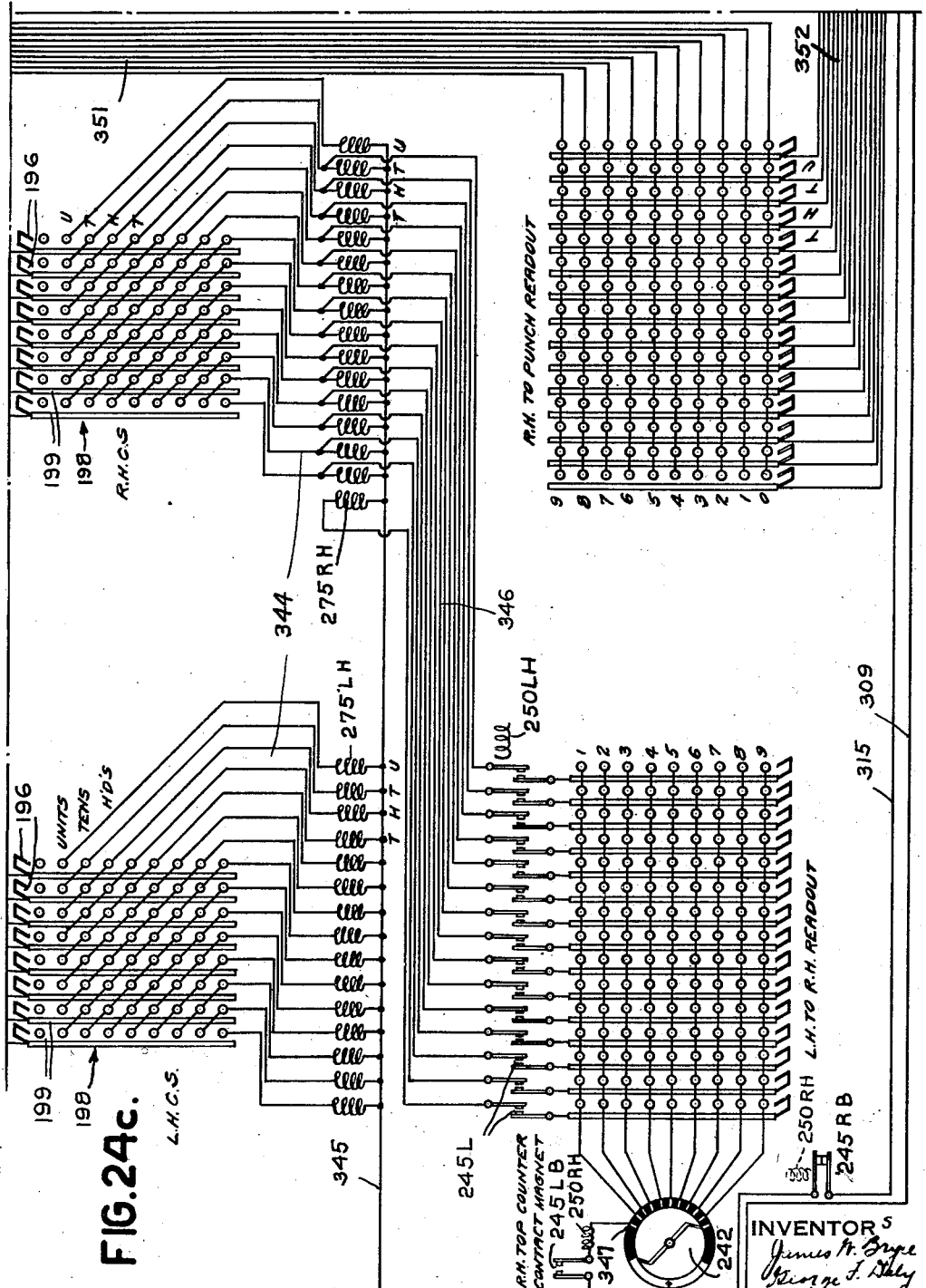

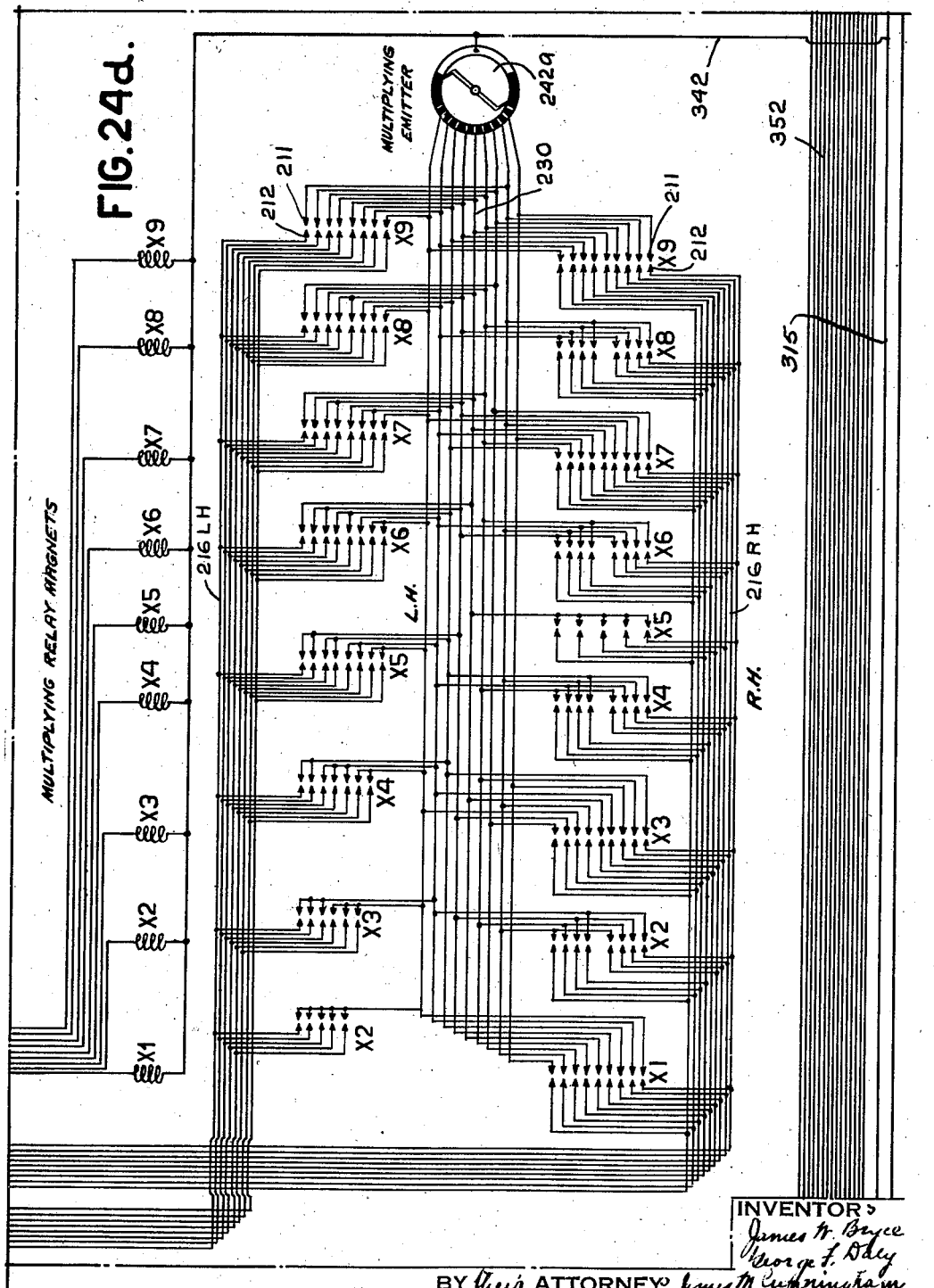

Nov. 24, 1936.  J. W. BRYCE ET AL  2,062,117
RECORD CONTROLLED ACCOUNTING MACHINE
Filed Aug. 1, 1931   23 Sheets-Sheet 21
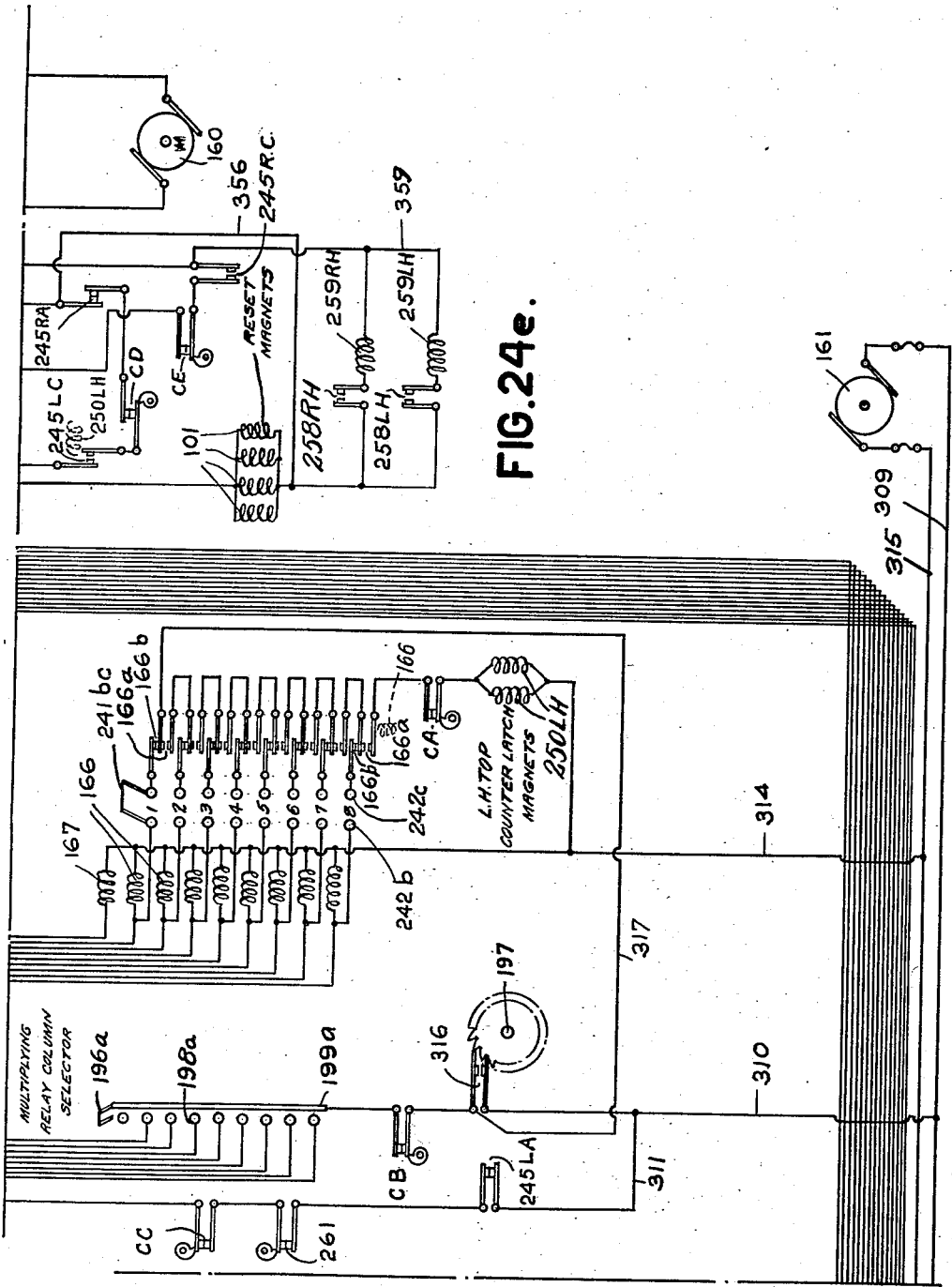

Nov. 24, 1936.   J. W. BRYCE ET AL   2,062,117
RECORD CONTROLLED ACCOUNTING MACHINE
Filed Aug. 1, 1931   23 Sheets-Sheet 22

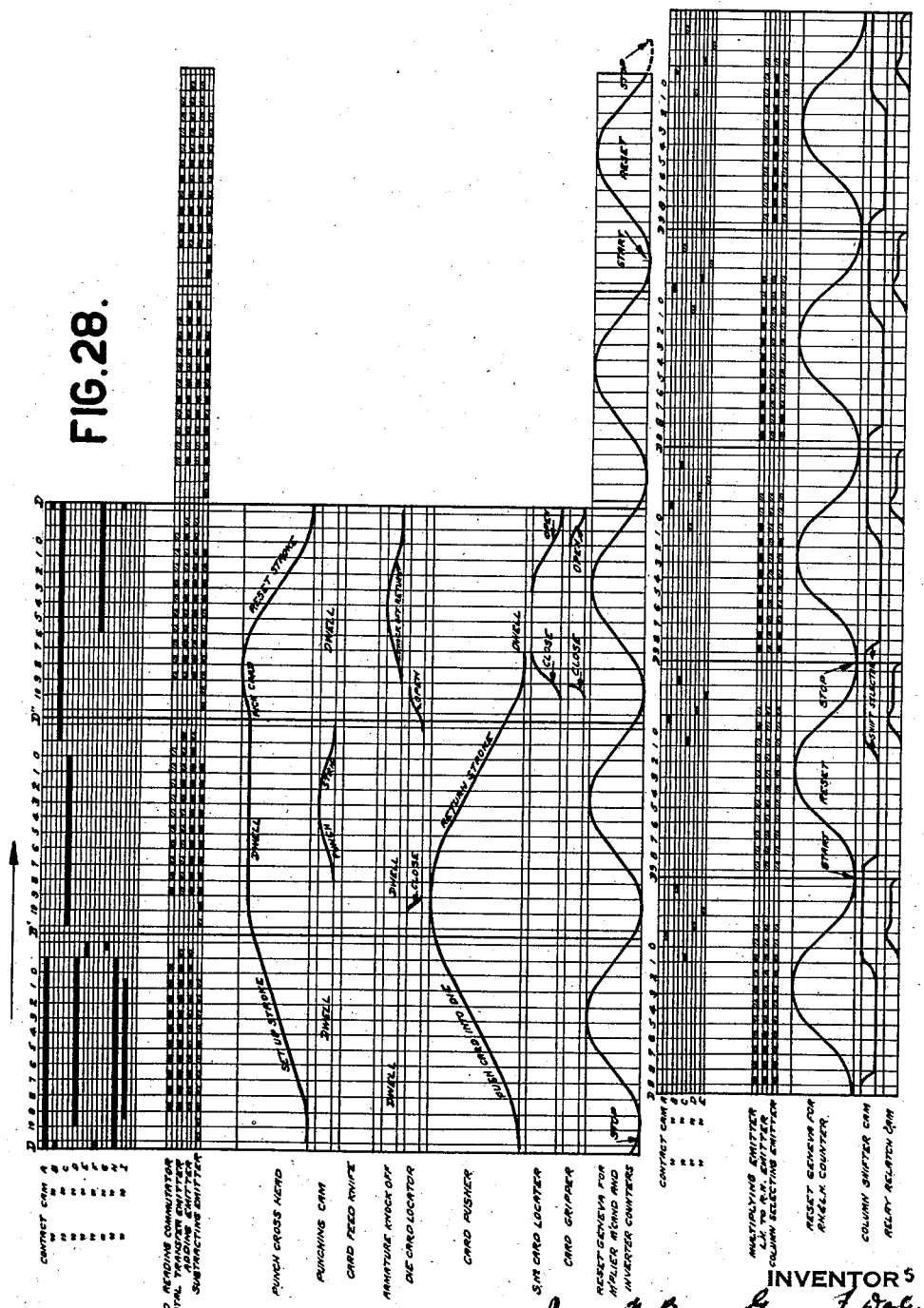

Patented Nov. 24, 1936

2,062,117

UNITED STATES PATENT OFFICE 2,062,117

RECORD CONTROLLED ACCOUNTING MACHINE

James W. Bryce, Bloomfield, N. J., and George F. Daly, Johnson City, and James M. Cunningham, Endicott, N. Y., assignors, by mesne assignments, to International Business Machines Corporation, New York, N. Y., a corporation of New York Application August 1, 1931, Serial No. 554,490

48 Claims. (Cl. 235—92)

This invention relates generally to accounting machines and more particularly to record controlled and record making accounting machines. Previous constructions have been devised wherein an accounting machine was adapted to derive two factors of a to be performed computation from a record and to thereafter multiply these factors and produce a record of the product. The product record in these previous machines was made by punching back product designating perforations upon the record from which the factor data was derived. Heretofore in these previous machines the card reading mechanism, the punching mechanism and the calculating and multiplying mechanism was made in a large machine and in a single mechanical unit. Due to the desirability for having large capacity in machines of this class the bulk of such machines becomes quite great. If proper columnar capacity was provided in the machine the bulk was excessive and if the bulk was kept to desirable proportions the column capacity of necessity had to be restricted.

It is accordingly one of the objects of the present invention to provide a machine which comprises two separate mechanical units which can be physically separated one from the other. These two separate mechanical units are, however, electrically connected so that one unit can cooperatively control the operation of the other unit and the other unit in turn can cooperatively control the first named unit.

A further and more detailed object of the present invention resides in the provision of a record controlled multiplying machine wherein a two unit construction is employed, one unit comprising a card reading and punching section, this section also having certain entry retaining devices and the other section of the machine comprising a computing and calculating section with provisions in the form of electrical connections intermediate the sections for controlling the action of each section from the other section.

A further object of the present invention resides in the provision of a split accounting machine comprising two sections and wherein one section sends current impulses over to the other section to derive a reading therefrom and which readings then flow back to the sections from which the impulses were emitted to control the operation of that section of the machine.

A further object of the present invention resides in the provision of an accounting machine having two physically distinct sections with provisions in each section for emitting current impulses to the other section which impulses in each case flow back to the section from which the impulses were emitted to control the action of such sections.

A further object of the present invention resides in the provision of certain improved interlocking controls which insure the completion of the requisite operation cycles for each section before operating cycles are initiated upon the other section and for also effecting automatic initiation of operating cycles on the respective other sections when certain operating cycles are completed on each section.

A further object of the present invention resides in the provision of a split form of two unit machine in which a separate driving motor is provided for each machine and in which each machine is provided with alternating current generators for supplying current to its own machine in some cases and to the related machine in other instances.

A further object of the present invention resides in the provision of an improved punching mechanism with provision for positive actuation of the punch selector devices.

A further object of the present invention resides in the provision of a record controlled accounting machine with an improved factor entry counting means providing for the deriving of the factor data alternatively from each card passing through the machine or for deriving one of the factors from a special master card holding such factor and using such held factor in cooperation with succeeding cards until a new master card passes through the machine.

A further object of the present invention resides in the provision of a multiplying machine which is adapted for operation optionally at the will of the operator either under master card control for one factor or under a control in which both factors are derived when each card passes through the machine.

A further object of the present invention resides in the provision of a record controlled accounting machine embodying means for handling master cards and item cards and wherein automatic means is provided under the control of a master card for suppressing resetting operations and other computing operations until a new master card passes through the machine.

A further object of the present invention resides in the provision of a record controlled accounting machine wherein provision is made for eliminating the punching or recording of undesired zeros on the master cards.

A further object of the present invention resides in the provision of an improved cycle controller and column shift mechanism for multiplying machines of this general class.

A further object of the present invention resides in the provision of an improved multiplying panel structure, such panels being mechanically interchangeable and arranged so as to provide the selective wiring of the panels in accordance with the multiplying value which is desired to be allocated to any particular panel.

A further object of the present invention resides in the provision of improved means for deriving two component parts of a multiplicand factor from a card and optionally either adding these two factors together to obtain the ultimate multiplicand or subtracting one component from the other component to obtain the ultimate multiplicand.

A further object of the present invention resides in the provision of a multiple unit accounting machine, each unit being provided with impulse emitters to emit impulses at desired times either to its own unit or to the other unit and with means for controlling the emission of impulses according to the operations which the machine sections are intended to perform.

While the invention has been illustrated as applied to a multiplying record controlled accounting machine, certain features of the arrangement are not limited to multiplication only, but find utility in two unit tabulating machines generally and accordingly a further object of the present invention resides in the provision of an improved two unit tabulating machine having additional capabilities over previous machines in the art.

Further and other objects of the present invention will be hereinafter set forth in the accompanying specification and claims and shown in the drawings, which by way of illustration show what we now consider to be one and a preferred embodiment of the machine.

In the drawings:

Figures 1 and 1a together show an elevational view of the complete machine. Fig. 1 shows a side elevational view of one unit of the machine, viz. the card handling, entry receiving device and punching unit and Fig. 1a shows a front elevational view of the computing section of the machine with certain related mechanisms;

Fig. 4 is a transverse sectional view of the record handling section of the machine, the section being taken substantially on lines 4—4 of Fig. 3 and looking in the direction of the arrow;

Fig. 5 is a transverse sectional view taken substantially on lines 5—5 of Fig. 3 and looking in the direction of the arrow;

Fig. 5a is a detail view of certain cam contacts;

Fig. 6 is an enlarged view of the punch selecting mechanism which is shown on smaller scale on Fig. 4. In Fig. 6 certain of the parts are shown in displaced punch selecting position;

Fig. 10 is an enlarged detail view of the gear box and gear drive for the entry receiving devices and the inverting counter shown in Fig. 1; this view shows the gear box of Fig. 1 with the front plate removed;

Fig. 11 is a detail sectional view taken substantially on line 11—11 of Fig. 10 and looking in the direction of the arrows;

Figure 1:
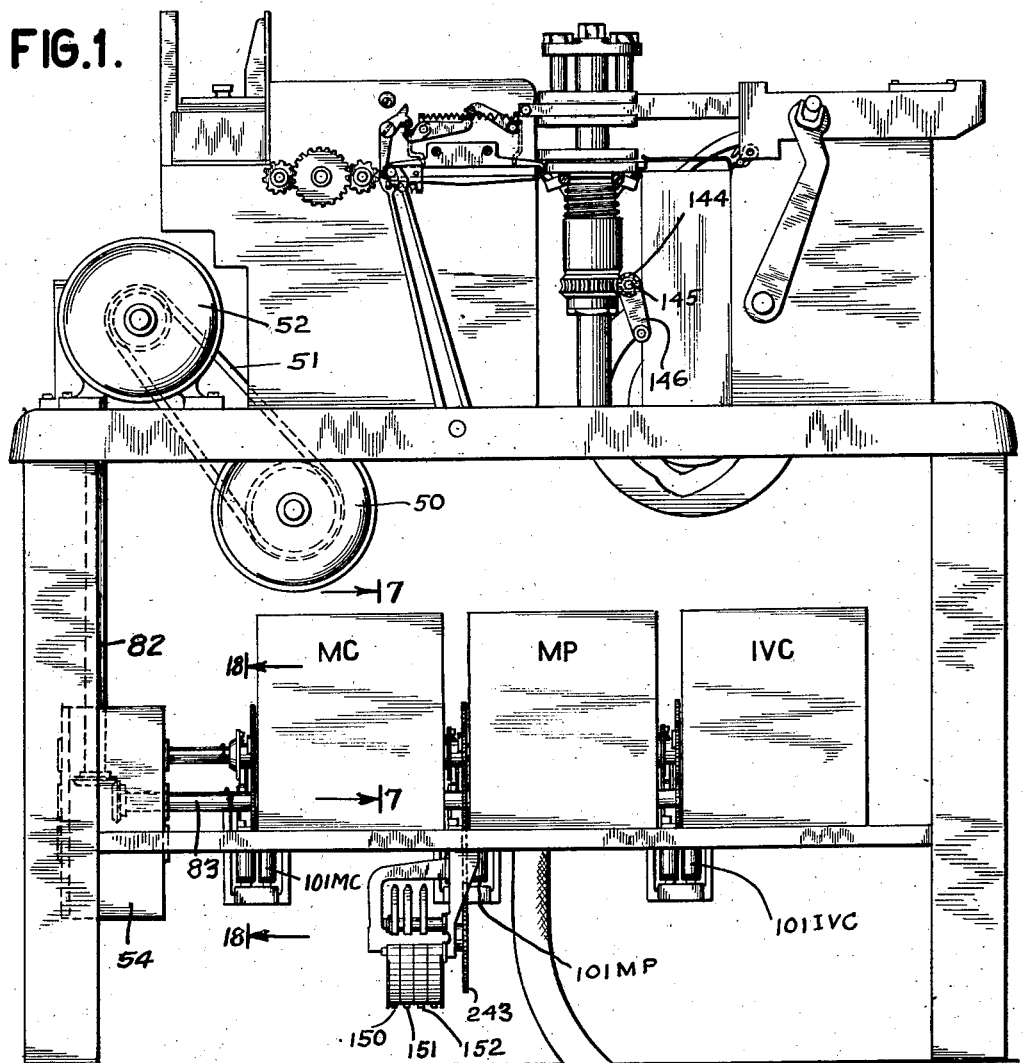
Figure 16:
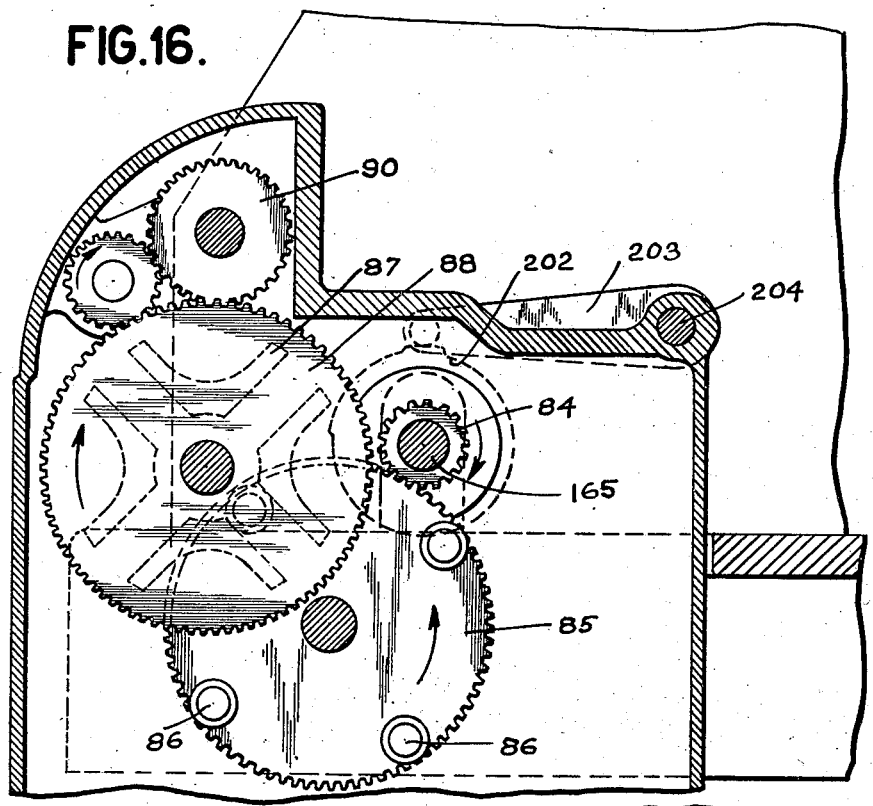
Figure 17:
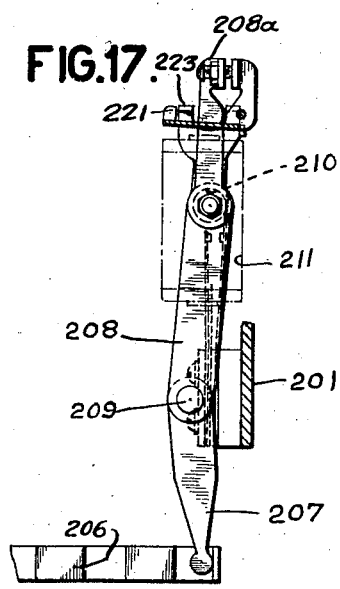
Figure 18:
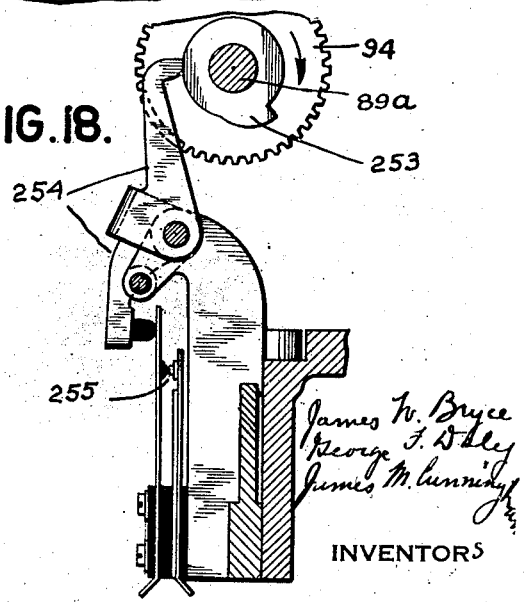
Figure 19:
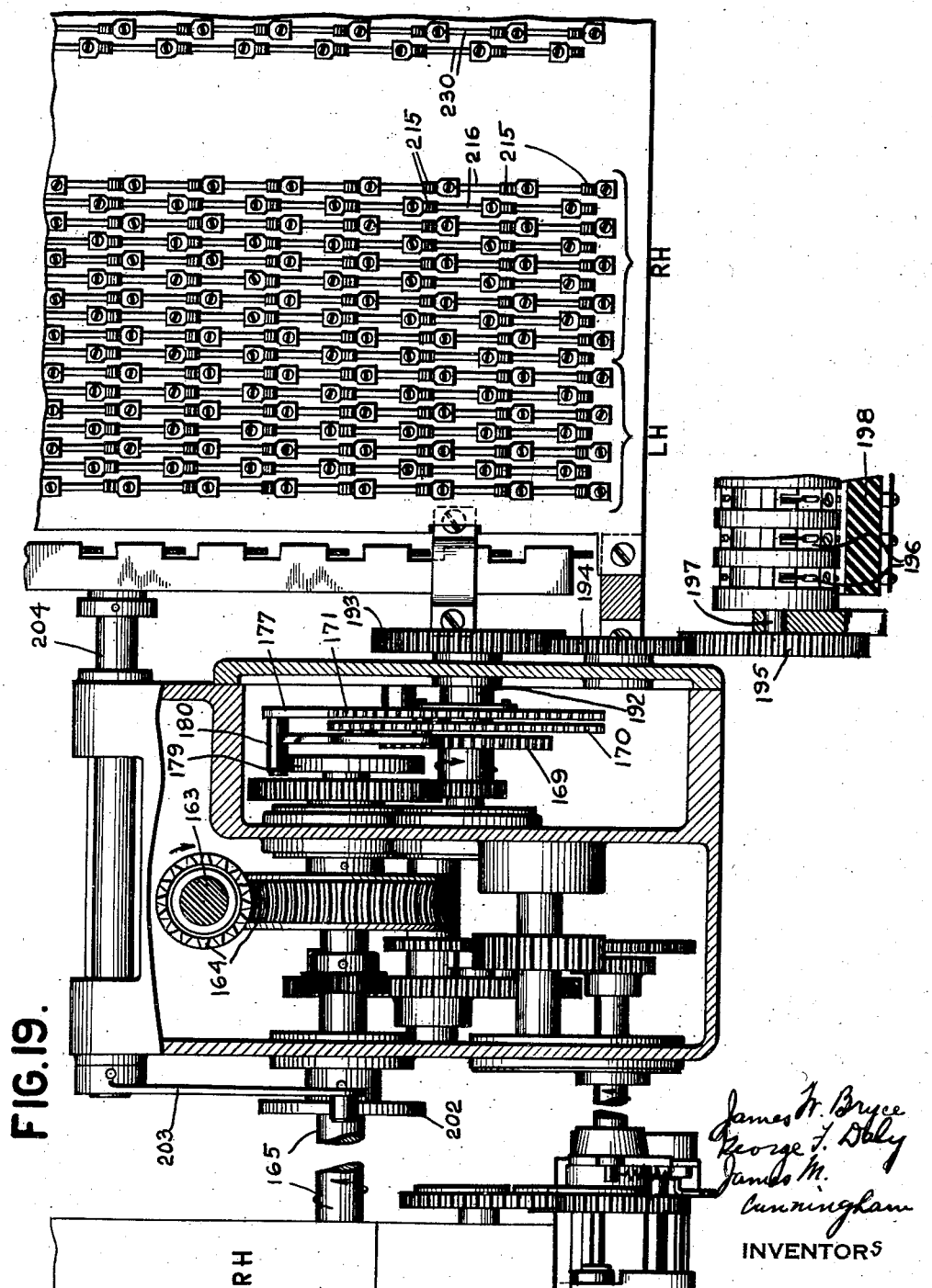
Figure 20:
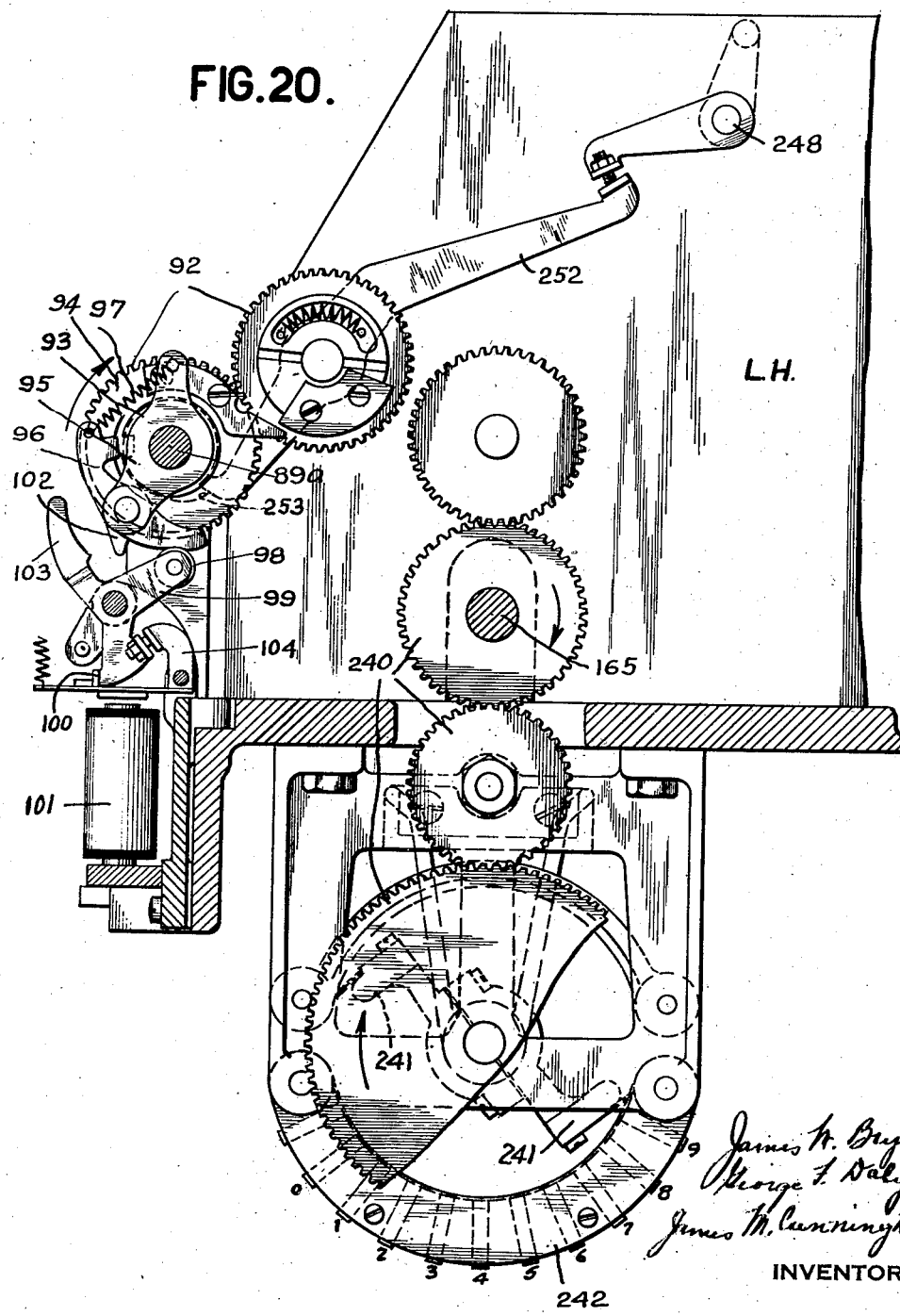
Figure 21:
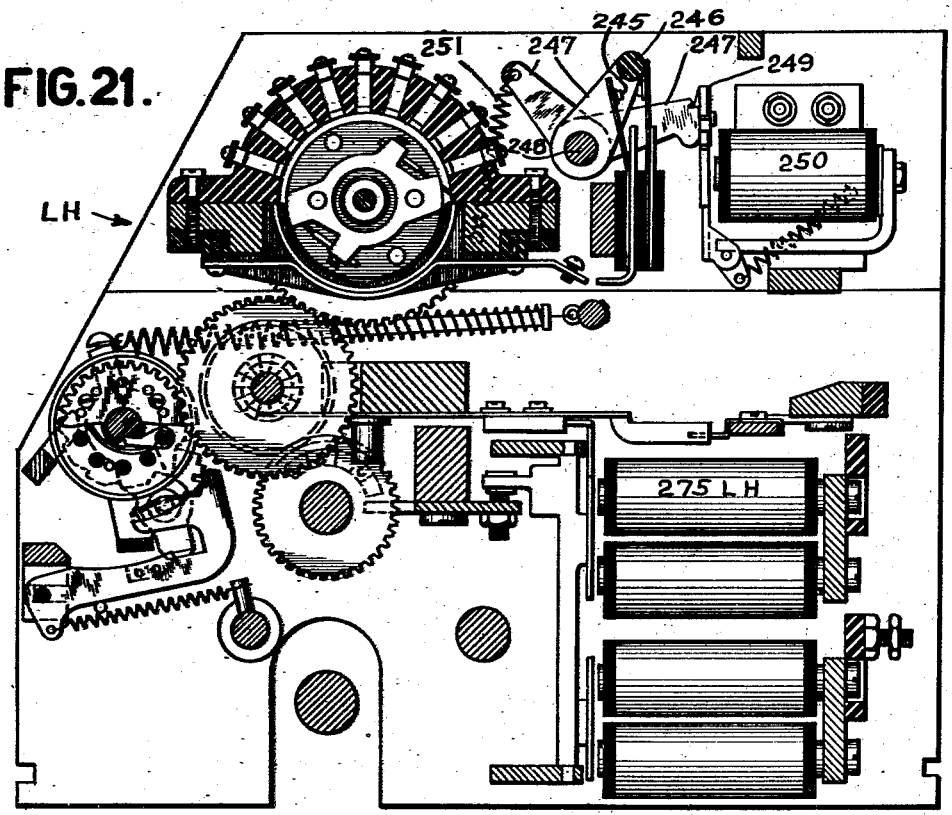
Figure 22:
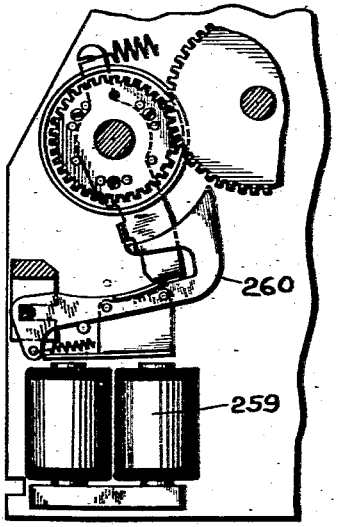
Figure 23:
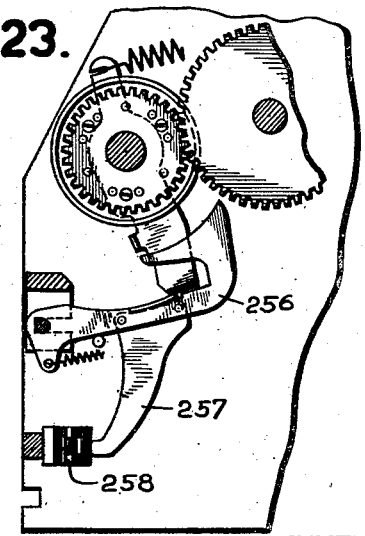
Figure 24A:
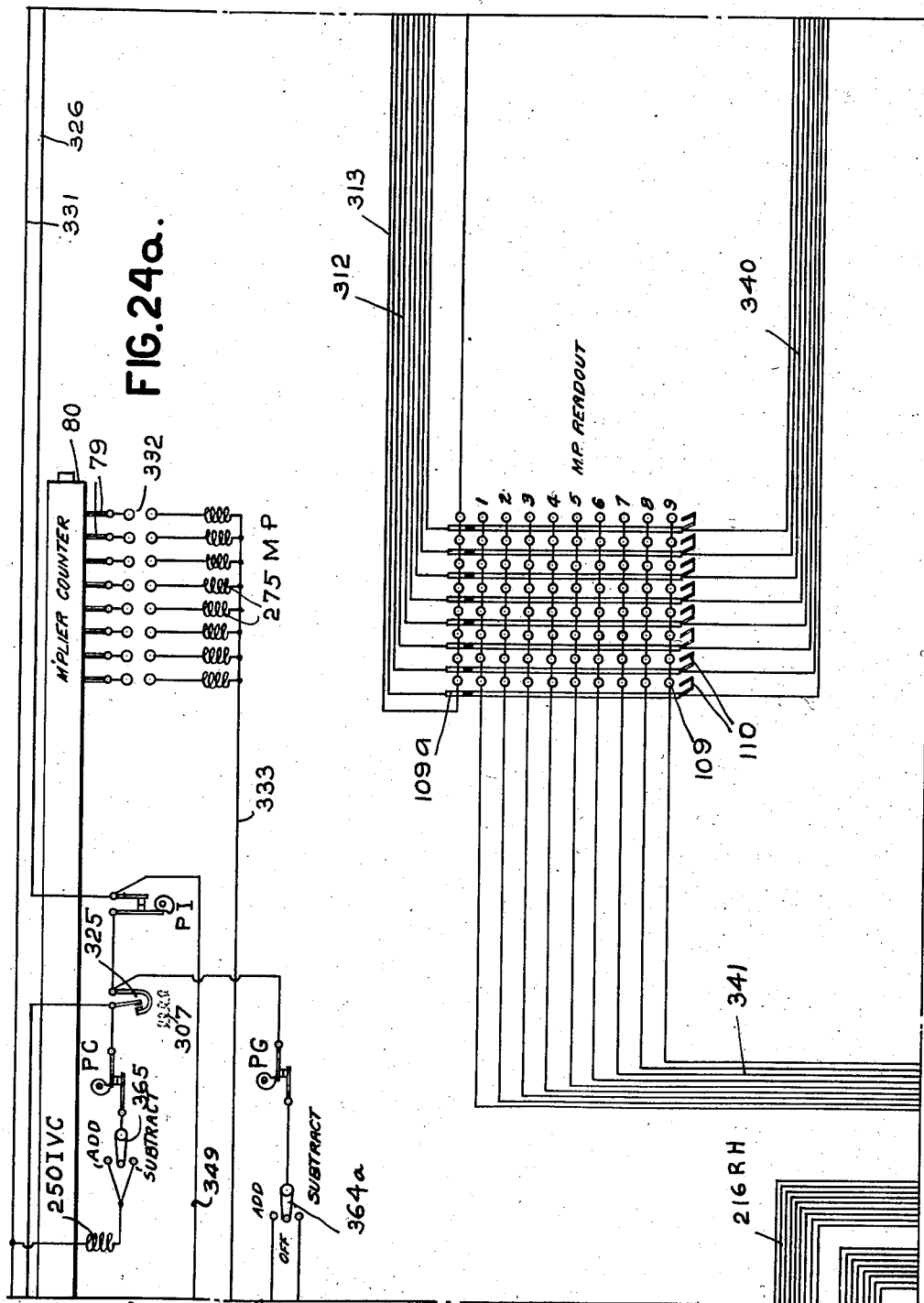
Figure 25:
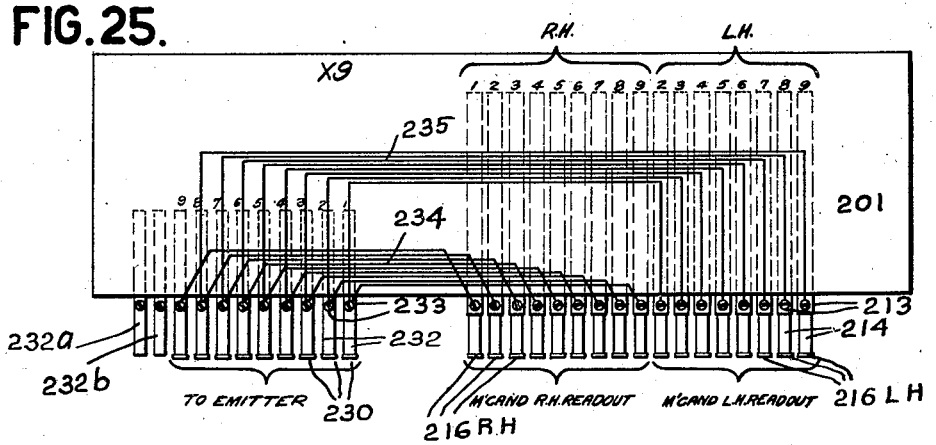
Figure 26:
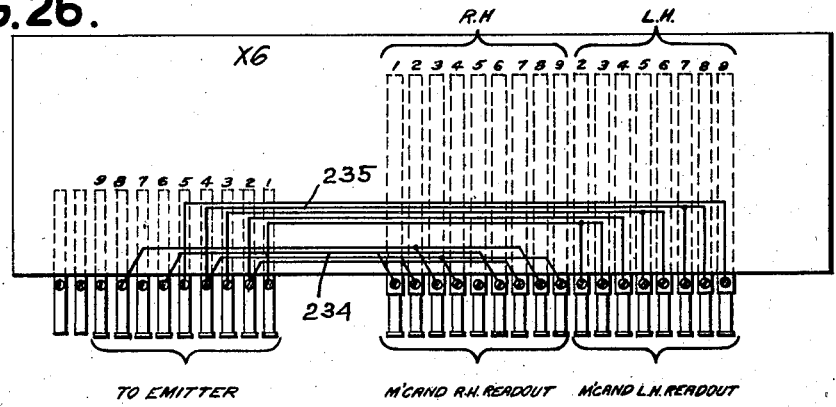
Figure 27:
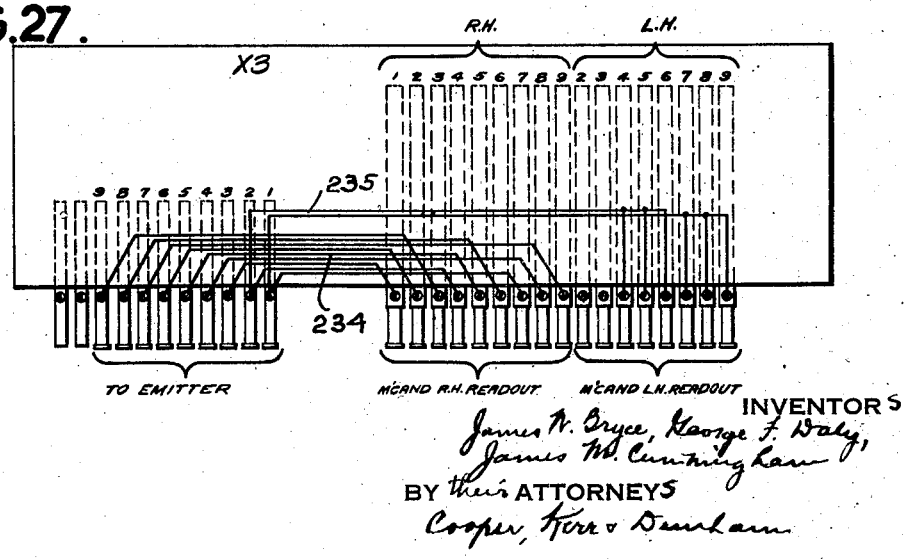

Fig. 12 is a detail sectional view of certain parts in the computing section of the machine. The section is taken substantially on line 12—12 of Fig. 1a and looking in the direction of the arrows; this view shows parts of the multiplier relays and parts of the cycle controller and column selecting section of the machine. Fig. 12 also is a sectional view taken on line 12—12 of Fig. 13;

Fig. 13 is a view partly in front elevation and partly in section showing certain parts of Fig. 1a and with certain parts removed. More particularly the section of this view is taken substantially on line 13—13 of Fig. 12 looking in the direction of the arrows;

Fig. 14 is a detail sectional view taken substantially on lines 14—14 of Fig. 13. This view shows certain parts of the cycle controlling and column shifting mechanism of the machine;

Fig. 15 is a positional view of certain parts shown in Fig. 14;

Fig. 16 is a detail view showing the reset drive for the LH and RH accumulators in the computing section of the machine; the section is taken substantially on lines 16—16 of Fig. 13 looking in the direction of the arrows;

Fig. 17 is a detail view of the relay tripping mechanism for the multiplying relays. This view shows certain parts which are shown to the right in Fig. 12 but with the magnet shown in Fig. 12 removed; Figs. 17a and 17b show positional views of certain parts shown in Fig. 17; Fig. 17c is a detail of the contacts and plugs of the multiplying relays;

Fig. 18 is a detail view of certain reset controlling contacts used in the card handling section of the machine. The view is taken substantially on lines 18—18 of Fig. 1;

Fig. 19 is a sectional view of the parts shown in Fig. 13, the section being taken substantially on lines 19—19 of Fig. 13 looking in the direction of the arrows;

Fig. 20 is an elevational view of one of the accumulating devices of the machine showing the reset drive therefor and the drive to the emitter device of the computing section of the machine. The view is taken substantially on lines 20—20 of Fig. 1a looking in the direction of the arrows;

Fig. 21 is a sectional view of one of the LH accumulating devices of the computing section of the machine. The section is taken substantially on line 21—21 of Fig. 1a looking in the direction of the arrows;

Figs. 22 and 23 are detail views of the carryover devices which are utilized intermediate the two accumulating sections of the LH and RH accumulators. These devices are intended to couple two counter units together so that in effect the two accumulators comprise one accumulator of larger columnar capacity;

Figs. 24, 24a, 24b, 24c, 24d and 24e taken together show the circuit diagram for the complete machine; Figs. 24, 24a and 24b show the circuits in the card handling section of the machine shown in Fig. 1 and Figs. 24c, 24d and 24e show the circuits which are in the computing section of the machine, i. e. as shown in Fig. 1a. The circuit connections intermediate the computing section and the card handling section are all included in a single cable as shown in Figs. 1 and 1a but in the circuit diagram they are shown as individual circuits for clarity of the diagram;

Figs. 25 to 27 show the wiring arrangements of certain of the multiplying panels used in the machine;

Fig. 28 is a timing diagram of the machine;

Fig. 29 is a typical computation which the machine is adapted to perform. This view is diagrammatic illustrating the manner in which computation is performed by the machine;

Figs. 30, 31 and 32 show the normal position of certain magnetically controlled contacts of the instant machine. These views show the certain two blade normally latched open contacts, certain two blade normally latched closed contacts and certain three blade contacts, one pair of which are latched closed and another pair of which are latched open.

Before describing the details of construction of the machine it will be briefly explained that the machine comprises a card handling section as shown in Fig. 1. In this card handling section or unit there are card handling devices, card analyzing devices, entry receiving devices for the multiplier and multiplicand and an inverting counter for purposes which will be hereinafter described. Also disposed in the card handling section of the machine are punching devices for punching back upon the record the products and the result of the computation performed by the machine.

The computing section of the machine shown in Fig. 1a comprises LH accumulating devices, RH accumulating devices, cycle controlling and column shifting mechanism, emitting mechanism, and multiplier relay mechanism, the latter being in the form of multiplier panels.

The card handling section is also provided with emitter devices and in general it may be stated that the emitter devices of the computing section of the machine emit impulses which flow over to the readout devices of the entry receiving devices in the card handling section of the machine and these impulses in turn flow back to the computing section of the machine and control its operation. Also the emitting devices on the card handling section of the machine emit impulses to the computing section of the machine and these impulses flow back and control the action of certain parts of the card handling section of the machine, viz. the punch selectors.

It may be further explained that the machine is provided with means whereby a multiplicand and a multiplier may be directly multiplied to obtain the product. The machine is also adapted to take a multiplicand which comprises two components and to either add these two components together to obtain the ultimate multiplicand or to subtract one component from the other to obtain the ultimate multiplicand. The addition or subtraction of multiplicand components is effected by the inverting counter designated IVC in Fig. 1.

In general the machine operates to analyze multiplicand and multiplier factors from a prepunched card. Upon analyzation of each record, the multiplicand and multiplier amounts are entered into the entry retaining devices of the card handling section of the machine and in this section of the machine, if the machine is so set, the multiplicand components are either added or subtracted, or the multiplicand entry is handled as a single factor. After the amounts have been entered and added or subtracted as the case may be, the computing section of the machine comes into operation and effects the multiplying computation, thereafter automatically by the operation of the machine, the product obtained by the computing section of the machine is transmitted back to the card handling section of the machine to control the selection of punches so that ultimately the record will have perforated upon it product punchings representative of the computation performed with the machine.

Card handling section of the machine

Figure 3:
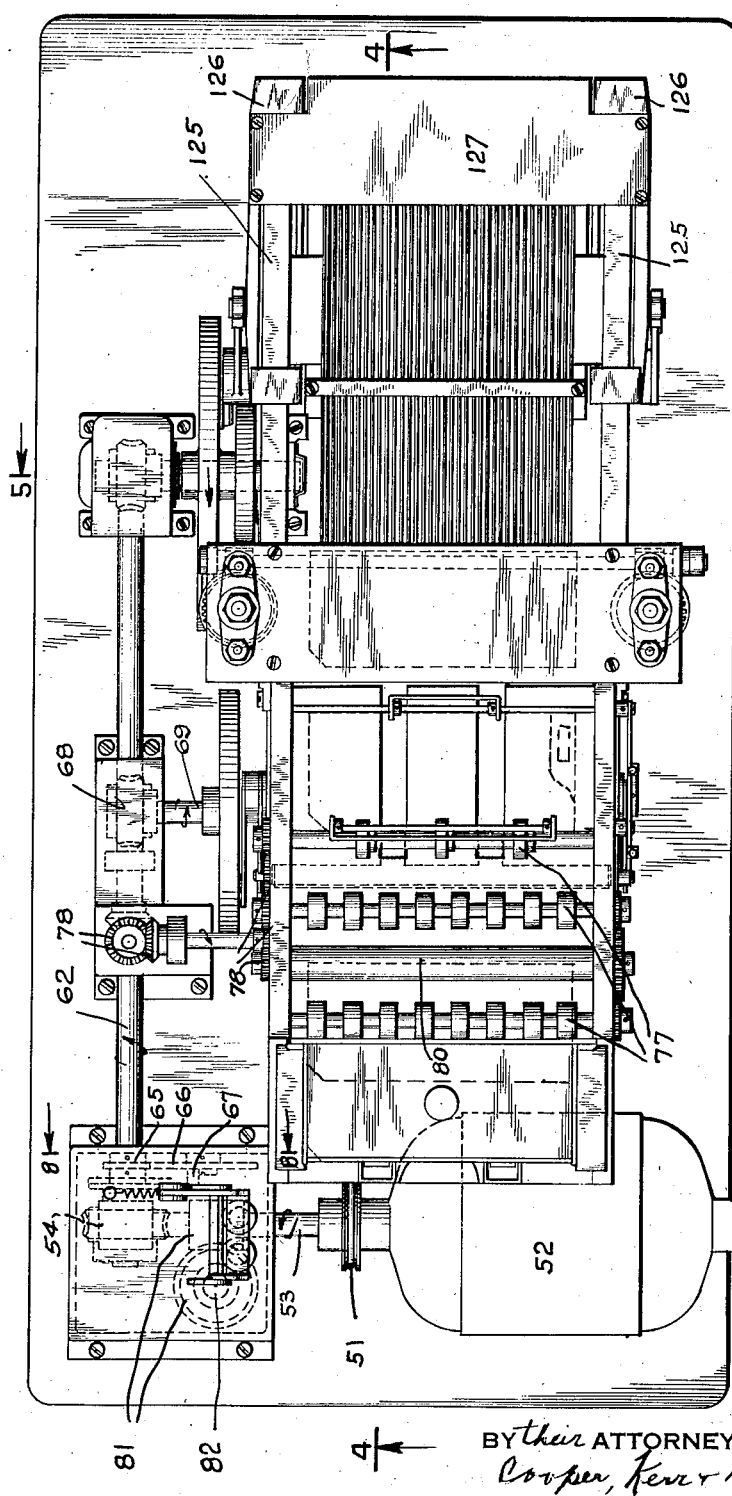
Fig. 3 is a top plan view of the record handling section of the machine shown in Fig. 1.

The card handling section of the machine will be first described, reference being first made to Figs. 1, 3 and 4.

Figure 8:
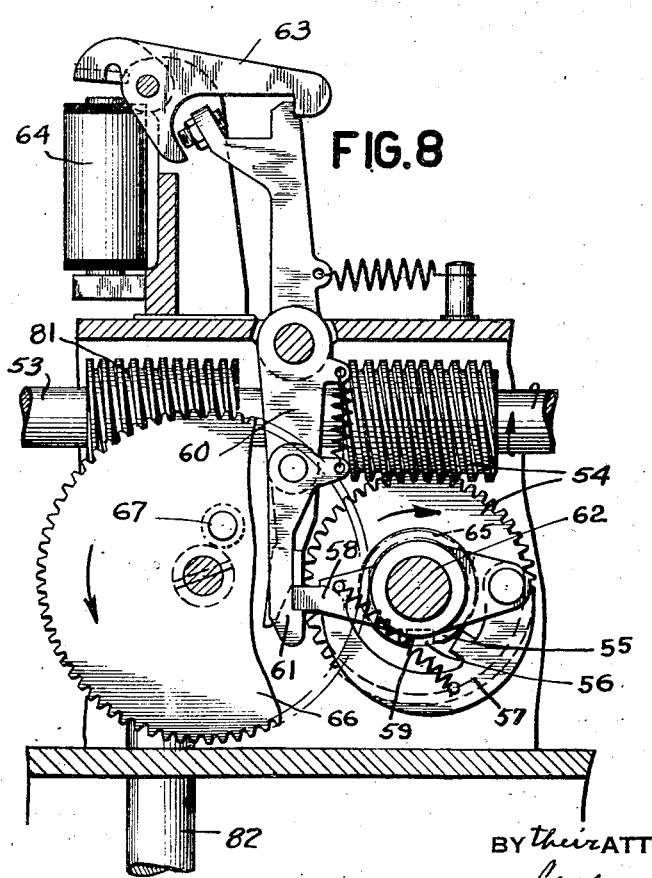
Fig. 8 is a detail view of the main clutch of the card handling section of the machine, the view being taken substantially on line 8—8 of Fig. 3; the casing is shown omitted in this figure.
Figure 9:
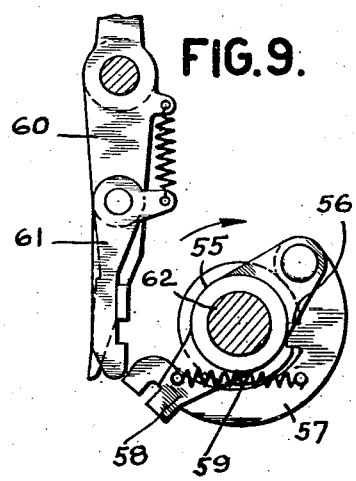
Fig. 9 is a detail positional view of certain parts shown in Fig. 8.

Referring to Fig. 1, 50 is the driving motor of this section of the machine. This motor through a belt and pulley drive 51 also drives an A. C. generator 52. This generator is used to produce alternating current impulses for controlling various magnets of the machine. The use of the A. C. generator permits the elimination of resistances in various counter circuits and the elimination of various contacts in the magnet circuits of the counters or entry receiving devices of the machine. The A. C. generator 52 has provision on its armature for supplying D. C. current and on the circuit diagram (Fig. 24b) this section is shown separately for clarity of the diagram. On the diagram the D. C. section of 52 will be labeled 52DC. The shaft 53 of the generator 52 extends into a gear box shown in Figs. 3 and 4 and through suitable worm gearing 54 drives a clutch element 55, (Figs. 8 and 9). This clutch element is provided with the usual clutch notch 56 and cooperating with it is a dog 57 carried upon an arm 58 and spring connected thereto by spring 59. The lever 60 and the latch 61 carried thereby cooperate with 57 and 58 in the usual way, that is, when 60 and 61 are retracted in a clockwise direction the clutch dog 57 is released and allowed to engage with the notch 56 of the clutch element 55. When this occurs element 58 will drive the shaft 62 and upon 60 and 61 being rocked in anticlockwise direction the clutch will be disengaged at the proper time in the cycle. Part 60 is normally latched up by a latch 63 to keep the clutch disengaged. Upon energization of clutch magnet 64 the clutch is engaged. Shaft 62 is provided with a pinion 65 which drives a gear 66, the gear ratio being 1 to 3. Carried on gear 66 is a stud 67 for re-latching and knocking back the lever 60. With this arrangement it will be appreciated that the assemblage in Fig. 8 is essentially a three-revolution clutch.

Referring now to Fig. 4 the shaft 62 is the main drive shaft for the entire card handling section of the machine. From this shaft various mechanisms are driven. The picker drive will be first described. Shaft 62 through worm gearing 68 (Figs. 3 and 4) drives a cross shaft 69. This cross shaft carries a number of cams, one cam being provided for actuating a linkage 70 which extends to the picker 71. Another cam is provided for actuating an arm 72 which extends to a pusher member 73 (see Figs. 4 and 2). Another cam is provided for actuating a member 74 which in turn actuates card locating members 75 in the die section of the machine.

After a card has been advanced from the card magazine 76 (Fig. 4) by the picker 71, such card is fed forward by the usual card feed rolls 77 (see also Fig. 3). Such feed rolls are driven from shaft 62 by the driving train 78. The usual analyzing brush station is provided, comprising a set of brushes generally designated 79 and a contact roll 80. The card is read in the usual manner at the analyzing station and the reading from the card is entered into the MC and MP receiving devices shown in Fig. 1. The drive for these receiving devices will now be described.

Entry receiving device drive

Shaft 53 through a worm drive 81 (Fig. 3) drives a vertical shaft 82 which shaft extends down into a lower gear box shown in Figs. 1 and 10. In the gear box suitable bevel gearing drives a shaft 83. This is the usual counter drive shaft of the machine and it drives the MC receiving devices, the MP receiving devices and the IVC devices in the usual manner. Also disposed in the gear box is a reset mechanism of novel construction.

Reset drive

Referring to Figs. 10 and 11, shaft 83 has fast to it a pinion 84 which drives a spur gear 85 carrying a multiplicity of Geneva pins or rolls 86. These rolls cooperate with the driven member 87 of the Geneva device, member 87 being secured to a gear 88 which drives the reset shaft 89 through an idler gear 90 and a pinion 91. It will be understood that shaft 83 is a constantly running shaft which rotates at all times when the motor 50 is in operation. The Geneva drive device just described is adapted to drive the reset shaft 89 with a motion which is both intermittent and regular and which also gradually accelerates the rate of drive from zero to maximum and then diminishes the rate of drive again to zero. By this type of drive, reset operations may be effected quietly and without shock to the parts and also in correct timing relation with the other mechanisms of the machine.

It may be explained that the individual resetting mechanisms of the entry receiving devices are clutched to the reset drive shaft 89 at a time or instant when the shaft 89 is practically stationary. The clutch mechanism for the reset of the entry receiving devices is the same as is used on the computing section of the machine for the RH and LH accumulators and it will accordingly be here described.

Each of the accumulators and entry receiving devices of the machine are provided with the usual reset actuating mechanism generally designated 92 in Fig. 20 which mechanism is of the type shown and described in Lake United States Patent No. 1,600,414, dated September 21, 1926. The shaft 89 previously referred to in the description of Fig. 11 will be designated 89a on Fig. 20 inasmuch as 89a is disposed in the computing section of the machine. Shaft 89a or 89 has fixed to it a clutch element 93 suitably notched. Fixed to the gear 94 (gear 381 of the above mentioned Lake patent) are the other elements of the one revolution clutch comprising a member 95 carrying a clutch dog 96. Clutch dog 96 is pivoted on member 95 and urged towards the notch in member 93 by a spring 97. Spring 97 tends to rock 96 clockwise and presses the tail of the clutch dog against a roller 98 carried upon a member 99. Member 99 at its lower end engages a latch of the reset magnet 101. Accordingly, when the armature is attracted, latch 100 is released and member 99 is permitted to swing clockwise allowing the clutch dog 96 to engage the clutch element 93. The timing of 101 may precede the actual clutching operation slightly and the dog 96 will engage the notch at the time when the shaft 89 or 89a comes substantially to rest, thereupon gear 94 is operated and reset is affected.

During the rotation of part 95 a tail 102 will engage an extension 103 from member 99 and rock this member in anticlockwise direction, thereby relatching the member 100 and through contact with part 104 positively knocking off the armature of 101. 99 by the above operation will have been relatched in position to contact with the tail of the clutch dog 96 and upon one complete revolution of this clutch dog the clutch dog will be disengaged from the clutch element.

In the foregoing manner one complete cycle of rotation is imparted to the reset mechanism of each of the counters or entry receiving devices of the machine.

It will be understood that there is a reset control magnet 101 for each of the entry receiving devices MC, MP and IVC and these will be designated 101MC, 101MP and 101IVC (see Fig. 1). The reset mechanism just described forms the subject matter of a separate application of James M. Cunningham, Serial No. 645,741, filed December 5, 1932.

Figure 7:
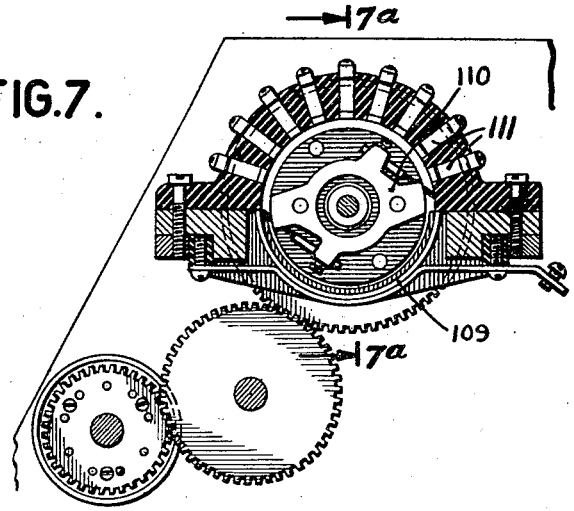
Fig. 7 is a transverse sectional view of the multiplicand entry receiving device and more particularly shows the readout mechanism for the multiplicand entry receiving device. The section is taken substantially on lines 7—7 of Fig. 1.
Figure 7A:
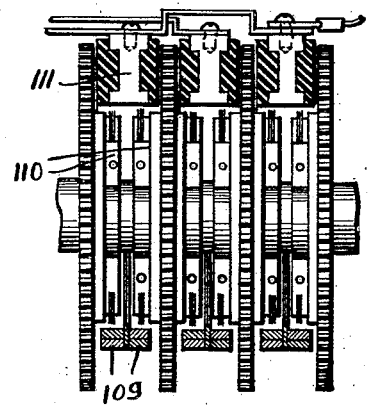
Fig. 7a is a detail section taken substantially on line 7a—7a of Fig. 7 and looking in the direction of the arrows.

The foregoing description has described the entry of the multiplicand and multiplier into the MC and MP receiving devices of the machine. These devices are the usual type and comprise electromagnetically actuated counters, which generally are of the type shown in Lake Patent No. 1,307,740, except that the contact devices therein employed are omitted on account of the alternating current generator being employed. In place of utilizing a step cam readout device as previously customarily used on tabulators, commutator type readout devices are employed on the MC and MP receiving devices and in fact on all of the entry receiving devices and counters of the machine. These commutator readout devices are of conventional construction employing a rotatable brush carrier 110 (Fig. 7), the brushes of which cooperate with segment spots generally designated 111 and which receive current from strips 109. Upon the MC accumulator, dual commutator arrangements are employed as shown in Fig. 7a to give a dual setting up of the multiplicand as is customary in multiplying machines of this type. It may be explained that in the MC entry receiving device, the commutator is dual, in the MP device the commutator is of the single type, and single type commutators are also used on the IVC counter and upon the RH and LH counters of the computing section of the machine.

The use of the IVC device will be hereinafter explained.

Figure 2:
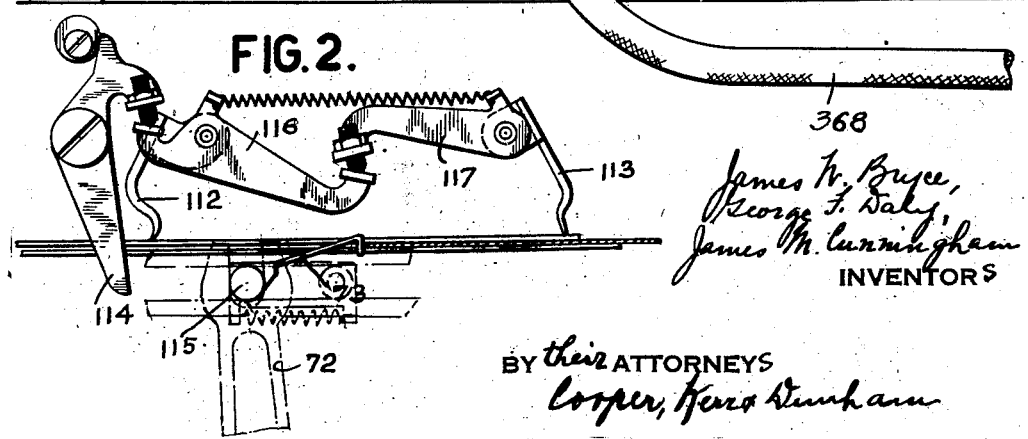
Fig. 2 is an enlarged detail view of certain of the parts shown in Fig. 1 which are used for positioning the record cards which are handled by the card handling mechanism of the machine.

The foregoing operation has described the passage of a card past the analyzing station and this card is ultimately fed by the last right hand feed roll 77 (Fig. 4) to a position in which it is to be picked up by the pusher 73. At this station provision is made for aligning the card in proper position preparatory to moving it into the die section of the machine. The card aligning mechanism is shown in Fig. 2. It comprises a pair of members 112 and 113, which members have a scissor-like motion and which are caused to approach each other and align a card between them by a member 114, which is contacted by a pin 115 upon the retrograde movement of the pusher arm 72. Member 114 upon being rocked in a clockwise direction rocks member 116 in an anticlockwise direction. 116 in turn rocks 117 in a clockwise direction, thus bringing about the scissor actuation of members 112 and 113. 116 and 117 are spring interconnected as shown. This mechanism aligns the card in proper position to be picked up by the pusher 73. Upon the forward movement of the pusher 73 the card is carried forward into the die section of the machine. The die section is generally designated 118 in Fig. 4. In this section similar scissor members 75 are provided for aligning the card in the die section and this alignment is brought about by means of member 74 which is in turn actuated by a suitable cam on shaft 69.

*Punching section of the machine*

The punching section is of the gang punch type with a multiplicity of punches 119 (Figs. 5 and 6) carried in the usual carrier and cooperating with a punching die 120. Punch selection is effected by punch selectors 121 which are slid over the punches to a proper position. Thereafter if the set of punches are raised the particular punch under a selector will be depressed through the card which is disposed above the die and the punch will be forced through the die. The setting of the selectors is effected in a different manner than heretofore.

Referring to Figs. 4, 5 and 6, the shaft 62 through worm gearing 122 drives a cam shaft 123 provided with a suitable cam for actuating a member 124 which drives the selector crosshead. The selector crosshead is slidably mounted for back and forth reciprocation on guide rods 125 (see also Fig. 3). This selector crosshead comprises a pair of U-shaped frames 126 connected together across their tops by a member 127 provided with serrated gooves 128 on its lower surface. Each punch selector 121 at its rear end has pivoted thereto an actuating dog or latch 129. This actuating dog or latch is normally kept in lower position out of the path of the serrations 128 by a triple arm latch 130 (see Fig. 4). 130 is adapted to be rocked in a clockwise direction by energization of a punch selector magnet 131. Rocking 130 clockwise rocks dog 129 in an anticlockwise direction as the crosshead is moving over the top of the dogs 129 and engages the respective dogs in respective ones of the serrations 128, thereafter the crosshead carries forward the punch selectors, the punch selectors being positively locked to the crossheads by the dogs 129 riding up over the cam plate or bar 132. The crosshead operating cam is so timed that when the crosshead moves forward a full stroke it will remain in advance position for a card cycle leaving the punch selectors in proper position to permit punching to take place. Carried by the crosshead 126 is a gripper device 133 of the usual construction and such is shown in Bryce Patent No. 1,791,950. As shown in Fig. 6 the gripper is slightly spaced from the leading edge of the card. To engage the gripper with the card, the cam for actuating the crosshead is arranged to impart a slight additional movement to the crosshead to the left after the punching operation has been completed, at which time the grippers 133 are tripped and caused to grip the card. Thereafter the crosshead moves to the right, the gripper withdraws the card and drops it in the discharge hopper 134 upon the opening movement of the grippers. The grippers are tripped in the usual manner and a packer device 135 is provided for packing the cards down into the discharge hopper. Upon tripping of the latch 130, such latch is retained in tripped position by dog 136. Upon return movement of the crosshead after card punching, dogs 129 drop down out of the serrations 128 and over the top of the arm 130a of the latch 130. Further movement of the crosshead to the right causes a camming surface 137 to contact with the dogs 129 and positively displace them in a downward direction rocking 130 in an anticlockwise direction past the impositive pawl retainers 136. The pawl retainers then latch up the 130 parts preparatory for a further operation.

The foregoing has described the manner of selecting the punches under the control of the punch selector magnets 131. Punching of the card is effected by raising the punching die 120. Disposed on shaft 123 is a suitable box cam operating a follower 140 which follower in turn rocks a cross shaft 141. Shaft 141 has arms connected to links 142 (Fig. 5). These links in turn connect to tubular members generally designated 143 which extend to the punching die and thus raise the die. The tubular members 143 are in two parts, the lower part being internally threaded and the upper part being externally threaded. 143a is the lower part and 143b is the upper. By turning 143a, the lower part, the upper part 143b can be relatively lowered to permit the separation of the die to remove a damaged card therefrom. Turning of 143a is effected by worm gears 144 which worm gears 144 are mounted upon a shaft 145 extending exteriorly of the machine and provided with a handle 146 (Fig. 1).

*Emitters*

The card reading section of the machine is provided with impulse emitters driven in time with the counter drive shaft 83. These impulse emitters will be generally designated 150, 151 and 152 (Fig. 1). These emitters are of identical construction to those used in the computing section of the machine and the construction will be more specifically explained in the description of that section of the machine. It is sufficient to here state that they are driven in proper timed relation with the counter drive shaft 83.

*Cam contacts*

There are also provided in the card handling section of the machine a number of cam contacts. These contacts are respectively designated PA, PB, PC, PD, PE, PF, PG, PH and PI and are shown on Fig. 5a.

*Computing section of the machine*

The computing section of the machine will now be described.

Referring to Fig. 1a, 160 is the driving motor for the computing section of the machine. This motor directly drives an alternating current generator 161 and between the motor and the generator, worm gearing 162 (Fig. 13) drives a vertical shaft 163 (see also Fig. 19). Shaft 163 through worm gearing 164 drives a counter drive shaft 165. This counter drive shaft 165 drives the two LH accumulators and the two RH accumulators in the usual way. Counter drive shaft 165 also drives the reset shaft 89a for the various accumulators by means of a Geneva drive similar to the Geneva drive previously described. This Geneva drive is shown in Fig. 16 and inasmuch as its construction is identical with the Geneva drive previously described, similar reference numerals will be used for it.

Cycle control and column shift

In multiplying machines of this type, provision is required for shifting the columnar entries of partial products into the accumulators. This is preferably effected by switching mechanisms. It is also desirable to provide for cycle controlling for the elimination of unnecessary computing cycles. For example, in a multiplication problem involving intermediate zeros in the multiplier, it is preferable that unnecessary computing cycles for the columns of the computation involving these zeros be dispensed with. It is accordingly desirable that means be provided for determining whether or not there are significant figures in each place in the multiplier and how many figures there are, so that the computing cycles of the machine can be automatically adjusted accordingly. Such cycle controller has to take into account not only intermediate zeros in the multiplier but zeros to the right or left of any significant figures in the multiplier. In the present machine a combined cycle controller and column shift mechanism is provided which will now be described.

According to the present embodiment, provision is made for reading eight places of the multiplier and determining whether or not these eight places represent digits or zeros. Provision is also made for sensing or ascertaining the location of the significant figures in the multiplier and controlling the operation of the machine accordingly. In other words, the machine can sense whether a multiplication is by say 78,000 or by 78 and control the multiplication accordingly.

Referring to Fig. 14, the cycle controller and column shift mechanism section is provided with a number of magnets 166. In the present embodiment eight of these magnets 166 are provided, one magnet being provided for each possible column of the multiplier, eight columns being the limit of multiplication in this particular machine. The magnets 166 are left deenergized in the event that a significant figure appears in the multiplier and are energized in the event that the multiplier includes zeros. For example, if in the units column of the multiplier there is a zero, the magnet pertaining to the units column would be energized. Likewise if the units column of the multiplier included a significant figure, for example, 2, the units magnet 166 would remain deenergized.

In the cycle controller and column selecting section of the machine there is, in addition to the eight magnets 166 previously referred to, another magnet designated 167 which has a function to be hereinafter described.

Referring to Fig. 14, shaft 165, which is the counter drive shaft of the machine and which is a continually running shaft, has secured to it a gear 168 (Figs. 14 and 13) which gear meshes with a pinion and constantly drives a ratchet wheel 169. Disposed adjacent to the ratchet 169 are a pair of disks 170 and 171. These disks have their peripheries notched with ratchet shaped teeth. The notches of one disk are reversely disposed to the notches on the other disk so that the ratchet teeth are in a sense in opposition to one another. Disk 171 has pivotally connected to it a link 172 and disk 170 has pivoted to it a dog 173 which dog is adapted for cooperation with the ratchet 169, the ratchet being located back of disk 170 (Figs. 13 and 14). The dog 173 is pivotally interconnected to the link 172, the pivoted connection between these parts extending through an aperture or hole through both of the disks 170 and 171. Disk 170 also is provided with a pin 174 which extends through an aperture in disk 171 and which pin has connected to it a spring 175 which in turn is fast to disk 171. The spring tends to displace disks 170 and 171 in opposite directions, i. e. if disk 170 is considered to be rocked in a clockwise direction by the spring 175, the disk 171 will be urged in an anti-clockwise direction.

Dog 173 is normally retained in position so that the tooth of the dog will clear the ratchet 169 by means of a plunger 176, having a portion which cooperates with the tail of the dog as shown in Fig. 14. Upon the drawing outward of the plunger 176 upon the energization of the controlling master-magnet 167, the dog 173 will be rocked in an anti-clockwise direction so as to engage the ratchet 169 under the influence of the spring 175 provided that the disks 170 and 171 are free to shift relatively to one another. These disks are normally prevented from such shifting movement by means of a dog 177 which is spring urged into cooperation with the notches in disk 171. In addition there is provided a pawl 178 which cooperates with the teeth in disk 170. 178 when engaged will prevent clockwise movement of 170 and 177 when engaged will prevent anti-clockwise movement of 171. It will be understood that normally with the plunger 176 engaged with the dog 173, disks 170 and 171 will both be stationary.

At a proper cycle time in the operation of the machine, the rotation of shaft 165 will cause a cam 179 to cooperate with a roller 180 on member 177 and rock this member 177 in a clockwise direction freeing it from disk 171. After this disk 171 is thus freed, spring 175 comes into action, provided 176 is withdrawn, and this will allow dog 173 to engage the ratchet, the parts now being in the position shown in Fig. 15. The ratchet will now drive the assemblage of disks in an anticlockwise direction.

Each of the magnets 166 has associated with it a plunger mechanism which acts as a differential stop. In Fig. 14 these plunger mechanisms have not been shown repeated for each magnet 166, but it will be sufficient to describe the operation of the plunger mechanism 181 which is shown in full. It may be explained that for each magnet 166 there is a plunger 181 which plunger 181 is similar in construction to plunger 176 and each of these plungers 181 when thrust forward is adapted to be in intercepting relation to the tail 182 of the dog 173. Each plunger when retracted outwardly is clear of intercepting relation with the tail 182. The tripping mechanism for plungers 176 and 181 is identical.

Referring to Fig. 13, energization of magnet 166 attracts its armature 183, which armature is pivoted at 184. The armature upon being rocked, releases itself from a locking notch 185 and allows the plunger to be thrust outwardly under the influence of a spring 186. The plunger 181 when in this position is out of intercepting relation with the tail 182 of dog 173. Lifting of the plunger 181 also closes one pair of contact mechanisms 166a associated with each plunger and opens up another pair of contacts 166b as will be readily understood.

It will be first assumed that all of the magnets 166 are deenergized. This means there is a significant figure in each place in the multiplier. The action will then be as follows: Upon withdrawing the plunger 176, which is the tripping plunger for the entire set, the disk assembly will rotate with a forwardly advancing movement until the first plunger 181 which is in intercepting relation, intercepts tail 182 and disconnects the pair of disks from the driving ratchet. Later on in the operating cycle, the plunger 181 pertaining to the units will be withdrawn by energization of its magnet 166. The disk assembly will again advance until the dog intercepts the next plunger 181 pertaining to the tens and this operation will be repeated for each of the successive plungers and orders of the multiplier.

Now assume that a single plunger, say the 181 plunger, pertaining to the tens order, is initially withdrawn. In this event, the disk assemblage will progress with an uninterrupted movement from the units intercepting position to the hundredths intercepting position. Each of the plungers 181 and the plunger 176 has associated with it and interconnected with it near its inner end a restoring bell crank member 190. These restoring bell crank members 190 have a tail portion in intercepting relation with a pin 191 (Figs. 13 and 14) which pin upon the forward advance of the disk 170 contacts with the bell crank members 190 in succession and pulls the plungers 181 positively inwardly against the tension of the springs 186. As each plunger is drawn inwardly a collar on the plunger (Fig. 13) contacts with a bell crank 187, which bell crank is interlinked with the armature 183 and positively knocks off the armature and restores it into latching relation with the plunger.

The intermittently controlled variable forward advancing movement of the disks is utilized for controlling column selection in the following manner: The inner disk 170 (Figs. 13 and 19) is connected to a sleeve 192 which sleeve in turn is fast to a gear 193 (Figs. 12, 13 and 19). Gear 193 in turn drives through an idler gear 194 to a driving gear 195 of a set of column shift switches. These column shift switches are generally similar to the readout mechanisms employed for the entry receiving devices. Each column shift switch embodies a brush assemblage 196 fixed to shaft 197, which shaft in turn is fixed to the gear 195. The brushes of the brush assemblage sweep over the segment spots of a commutator designated 198. A common conducting segment 199 is also provided for each commutator. A multiplicity of commutator devices 198 are provided as will hereinafter appear in connection with the description of the circuit diagram.

It will be appreciated that the cycle controller and column shift device is arranged to shift the brush assemblage say from the first segment spot to the second, then later to the third and so on and it may also skip spots if the electromagnetic selection provides for it. It may be mentioned that certain of the commutators 198 are provided for column selection. Other commutators of generally similar construction are provided for cycle selection and another commutator readout device is provided for multiplier relay selection. The brushes of all these readout mechanisms rotate in unison.

A circuit timer or interruptor is also disposed on shaft 197.

*Relay control section and multiplying panels*

Fixed to the base of the computing section of the machine are upright plates 200 (Fig. 13). These side plates 200 are slotted to receive a number of vertical plates 201, plates 201 being spaced apart from each other as shown in Fig. 12. Carried on each plate 201 is a magnet which will be generally designated X in Figs. 12 and 13. These magnets are control magnets and when energized serve to control the establishing of certain contacts in the relay control section of the machine. Preferably magnets X are used as trip magnets only and the armatures of these magnets are not required to actually shift the connects. Shifting is effected mechanically after the magnets X have been energized in the manner which will now be described.

Referring to Figs. 12, 13, 17, 17a and 17b the shaft 165 is provided with a cam 202. This cam cooperates with a follower crank lever 203 which rocks a shaft 204, which shaft in turn at its opposite end (see Fig. 13) is provided with an arm 205 which connects to a serrated operating bar 206. This serrated operating bar is disposed below and at one side of the base of the controlling relay section of the machine and into the serrations of this bar extend arms 207 of a contact operating bail structure. The arms 207 and arms 208 (Fig. 13) are pivotally supported by shafts 209 and are cross-connected by transverse members 210 of insulating material. These transverse members cooperate with one set of the contact blades generally designated 211.

It will be understood that each plate 201 has secured to it and insulated from it one set of the contacts 211. In cooperation with these contacts 211, are other sets of contacts 212 also carried by each plate 201 and insulated from the other set of contacts 211. The contacts 211 are provided with individual binding screw terminals 213 (Figs. 17c and 25) and the contacts 212 extend downwardly and are provided with plug-end prong portions 214, which extend into plug clips 215. All of the clips 215 in a common transverse row are connected by common bus connections 216. These bus connections it will be understood, extend across under the various sets of plates 201. The purpose of the bus connections is to provide for current supply to the various plug clips.

Referring to Figs. 17, 17a and 17b, one of the arms 208 (see Fig. 13) extends upwardly beyond the insulating cross member 210, this upwardly extending portion on Fig. 13 being indicated at 208a. Each arm 208a carries an armature restoring screw 217 for the purpose of knocking off the armature. The armature of each X magnet 218 is pivoted at 219 and each armature has an upwardly extending arm portion 220 disposed in cooperative relation to screw 217. Each armature 218 also has a latch portion 221.

Pivoted on the center of the bail 210 is a fork-shaped member 222 which has one fork 223 disposed between the latch member 221 and the arm 208a. The member 222 is normally rocked anti-clockwise by a spring 224, which is fastened at one end to an extension of arm 208a and which at the other end is connected to the arm 225 of member 222. With the contacts 211 and 212 open the contact pressure of contacts 211 will tend to rock 208a in an anticlockwise direction causing 223 to be pressed against the latching nose 221 of the armature 218 with the full spring pressure of all of the contacts. This results in a high pressure on the latch which makes unlatching difficult. Accordingly, provision is made for taking this tension off the latch before actuating the armature magnetically. This is done as an incident to and following the positive restoring and knocking off of the armatures as will now be explained. Upon the cam follower 203 encountering the highest rise of 202 (see Figs. 12 and 16) the serrated bar 206 is moved to its extreme left hand position. This moves 207 (Fig. 17) to its extreme left hand position which moves 208 to the right from the position shown in Fig. 17b until 208a contacts with 225a. Thereafter 222 is rocked in a clockwise direction freeing 223 from the latching nose 221 and allowing the armature to restore to normal position away from the X magnet. To insure this restoring action the screw 217 contacts with the upwardly extending part 220 of the armature. The next step, i. e. to place the armature in condition for easy unlatching, occurs upon the further rotation of cam 202 and at the time when the follower 203 is upon the intermediate rise of the cam. Under such conditions, the serrated bar 206 (Figs. 12 and 17) has moved slightly to the right. This movement permits 208a to move to the left from the position shown in Fig. 17, to the position shown in Fig. 17a. In this intermediate position 208a is kept a slight distance away from or from pressing upon 223 and 223 therefore does not exert heavy pressure upon the latch point 221 of armature 218. Accordingly, tension is taken off the latch point of the armature by the cam 202 which is power operated. Thereafter one of the X magnets may be energized. Upon energization of the X magnet armature 218 is drawn downwardly from the Fig. 17a position to the Fig. 17b position. Part 223 then snaps over the top of the latch 221 and following this action further movement of the cam 202 and its follower and associated parts permits the serrated bar 206 to move further to the right permitting the insulating bar 210 to clear the contacts and allow them to close under their own spring action. The parts are all now in the position shown in Fig. 17b.

By the above contact operating arrangement the load of unlatching the armature from its latch point is removed prior to the unlatching operation. Furthermore, the actual displacing movement of the bail 210, which cooperates with the contacts, is effected mechanically and furthermore mechanical power is utilized for restoring the magnet armatures and for mechanically unlatching such armatures as have been previously latched down.

It will be understood there is one X magnet for each plate 201 and that there are a set of contacts 211 and 212 for each X magnet.

It has been previously explained that extending under the sets of contacts 212 are bus bars 216 provided with plug clips 215 to receive the prongs 214. Also disposed transversely under the plates 201 and to the right from the contacts 210 (see Figs. 13 and 19) are a set of bus bars 230, which bus bars are also provided with plug clips 231. Cooperating with the plug clips 231 are contact prongs or plugs 232 which plugs are carried by insulating strips on plates 201. Each of the prongs 232 is provided with a binding screw terminal 233 (Figs. 12 and 25).

Referring now to Figs. 25 to 27, inclusive, several of the multiplying panels are shown with the wiring which is employed on these panels. Referring to Fig. 25 for example, this shows the X—9 multiplying panel. In this figure, wiring is indicated between certain selected ones of the binding screws 233 to selected ones of the binding screws 213. As shown, there are nine of the busses 230 through which impulses are fed into the multiplying panel from the binding screws 233. One set of wiring indicated generally at 234, extends to a number of binding screws 213 pertaining to the RH components so that current ultimately flows to the 216 busses which are indicated on the diagram as M'CAND—RH readout. Another set of wires, designated 235, extend from the binding screws 233 to the binding screws 213 and ultimately the impulses flow out on the 216 bus bars pertaining to the LH readout.

For simplicity in the subsequent description of the circuit diagram, the 216 busses which pertain to the RH readout will be numbered 216 RH and those pertaining to LH readout will be numbered 216 LH.

As shown in Figs. 26 and 27, different wiring 234 and 235 is employed on the different multiplying panels. The manner of wiring connections will depend upon the multiplier value of a particular panel. The multiplying panel wiring will be better understood by tracing through a typical example. Take for example, Fig. 25 and assume that the multiplication is to be one of 6 times 9, 6 being the multiplicand. The sixth bus bar of the 216RH series will be live and the sixth bus bar of the 216LH will also be live. Tracing through from bus bar 216RH numbered 6, current can flow through one of the wires 234 to the emitter bus bar 230 numbered 4. Accordingly when an impulse is emitted at 4, current can flow through from one bus bar of the 230 group to the sixth bus bar of the 216RH group. This flow of current will occur at the fourth index point in the cycle as determined by the emitter. Accordingly, there will be a product impulse representative of 4, 4 being the right hand component of the multiplication of 9 times 6. Similarly for the left hand component, from the number 6 bus bar of the 216LH group a circuit is established through one of the 235 group of wires over to the fifth bus bar of the 230 group. An impulse will be emitted over this circuit at the fifth index point position and accordingly there will be a result or product of 5, 5 being the LH component of the multiplication of 9 times 6.

Thi circuits can be similarly traced for the other multiplying panels.

The arrangement described permits standardization of the mechanical structure of the multiplying panels themselves. Changes in wiring can be made in these multiplying panels according to which multiplier amount the panel is to control. It will be understood that the multiplying panels which are carried on the plates 201 are readily removable and they can be replaced whenever occasion requires. Furthermore, the wiring of the multiplying panels can be made before the panels themselves are placed in the machine. This facilitates assembly and manufacture.

Normally only nine multiplying panels are used but provision is made in the present machine for a spare panel, it being noted in Fig. 12 that ten plates 201 are there shown. In addition on the plates 201 certain extra prongs 232a and b are provided as shown in Figs. 25 to 27 inclusive. The purpose of these extra prongs 232a and b and cooperating bus bars will be hereinafter explained in connection with the circuit diagram. It will be understood that each multiplying panel is provided with a complete set of terminals 233 and a double set of terminals 213 (one set for LH and the other for RH). All of these may not be wired up but they are available for wiring in case the multiplying component requires that given terminals are to be connected up by wires 234 and 235.

Computing section emitter

Disposed in the computing section of the machine and preferably below the base which supports the counters is a computing section emitter. Referring to Fig. 20, 165 is the counter drive shaft which is driven in the manner previously described. A gear train generally designated 240 drives an emitter brush assembly 241, the brushes of which cooperate with a commutator of conventional construction having a number of segment spots provided thereon. The commutator is generally designated 242. Several of such emitters are provided in the computing section of the machine. These are disposed side by side as shown in Fig. 1a and for convenience are numbered 242 and 242a. There are also an extra pair of emitters provided in this computing section their connectors or segment spots being designated 242b and 242c and their brush which connects the two sets of spots together being designated 241bc on the circuit diagram.

Emitters on card handling and card reading section of the machine

It has been previously explained that the card handling and reading section of the machine are provided with emitters 150, 151 and 152 (see Fig. 1). These emitters are of identical construction with the emitters which have been described on the computing section of the machine and such emitters are driven from shaft 83 through a train of gearing generally designated 243 which a train is similar to the 240 gear train on the computing section of the machine except that it is driven from shaft 83 in place of being driven from shaft 165.

In the readout section of the LH and RH accumulators and disposed to one side of the readout commutators there are provided certain supplementary contact mechanisms which will now be described.

Referring to Figs. 20 and 21, this view shows the LH accumulator and this accumulator is provided with a set of contacts which will be generally designated 245. Of these contacts 245, those designated 245L on the circuit diagram (Fig. 24c) are contacts which are normally latched open. One of these normally latched open contacts 245L being provided for each column of the counter. In the LH accumulator also there are additional contacts, one being designated 245LB which is also a contact which is normally latched open. In the LH accumulator there is also a contact of the normally latched open type and which is shown on Fig. 24e of the circuit diagram and designated 245LC. In the same LH accumulator there is also a contact which is normally latched closed, designated 245LA on the circuit diagram (Fig. 24e). In one of the RH accumulators there are similar contacts to these 245 contacts which will be designated 245RA and 245RC on Fig. 24e. 245RA is a contact which is normally latched closed and 245RC is a contact which is normally latched open. On Fig. 24c of the circuit diagram there is another contact 245RB which is a contact normally latched closed. The foregoing contacts in addition to being shown in the circuit diagram are shown in Figs. 30 and 31. These figures show the normal condition of the contacts and it will be understood that the said contacts shift to reverse position upon energization of their related magnets.

The contact mechanisms just described are operated in the following manner: Disposed in the accumulator is a bail 246 which cooperates with the contacts. This bail is carried on a three-arm lever 247 pivoted on shaft 248. Cooperating with one arm of the three-arm lever is an armature 249 of a controlling magnet generally designated 250. On energization of the 250 magnet the three-arm lever is released and drawn up, its spring in an anti-clockwise direction allowing the contact relations of contacts generally designated 245, to change. Restoration of the armature 249 and restoration of the contact relations is effected mechanically during resetting of the machine by a member 252 (Fig. 20) which member is loosely pivoted centrally thereof and which cooperates with the cam 253 fixed to the reset gear 94 of the computing section of the machine.

A similar set of contacts to those generally designated 245 are provided in the IVC counter. These contacts are designated 245IVCa and 245IVCb on the circuit diagram (Fig. 24) and their controlling magnet is designated 250IVC. The operation of these contacts is substantially the same. Two contacts are provided for each column of the counter and the restoring of the contact parts is effected by the resetting mechanism of the card readout section of the machine. Such contacts in addition to being shown in their normal position on the circuit diagram are shown diagrammatically in their normal condition in Fig. 32 of the drawings.

Disposed on the reset gear of the MC entry retaining device there is provided a similar cam 253 which, however, in place of being used for controlling contacts in the readout section of the counter is utilized for actuating contacts 255 (see Fig. 18). These contacts are shown on circuit diagram of Fig. 24b.

In the computing section of the machine, carryover means are provided intermediate the two sections of the LH counters and the two sections of the RH counters to make these two counter sections each in effect one large counter. Such carryover mechanism is shown in Figs. 22 and 23. The carryover latch 256 pertaining to the highest order wheel of each of the pair of counters is provided with a contact actuating part 257 adapted to close a contact 258. Closure of 258 energizes a magnet 259 and trips a carry lever latch 260 pertaining to the lowest order of the counter section to the left. In this way these two sub-divided counters are made in effect two large counters. The above mechanism is of conventional type as used in machines of this class. On the circuit diagram (Fig. 24e) the coils 259 of contacts 258 have been given suffix reference letters to show the accumulators with which the coils and contacts are associated, i. e. 259LH and 259RH and 258LH and 258RH.

Cam contacts

Disposed in the computing section of the machine on shaft 165 are a number of cam contacts CA, CB, CC, CD, and CE (Fig. 1a). These cam contacts it will be understood are constantly operating contacts making once per accumulating cycle of the machine. Also disposed on shaft 165 are cam contacts 261.

It has been explained heretofore that certain readout mechanisms are provided on the entry receiving devices and upon the LH and RH accumulators and that devices of somewhat similar construction are provided for column shift purposes. On the circuit diagram these assemblages have been labeled with names which identify their character. For instance MC—LH readout on Fig. 24 signifies that the readout device in question is on the multiplicand entry receiving device and that it is for the purpose of reading out from the MC device LH components. Similarly on the same figure MC—RH readout refers to the readout device on the same multiplicand entry retaining device for reading out RH components. On Fig. 24a MP readout signifies the readout device on the multiplier entry receiving device. This particular readout device is of slightly different construction having an extra set of spots in addition to the spots numbered from 1 to 9. On this readout device these extra spots which are at the zero position are for cycle controlling purposes and for the supply of current to each of these zero spots the common conducting strips 109 are subdivided, an additional section being provided designated 109a.

Referring to Fig. 24c the readout device designated LH to RH readout represents the readout device which is on the LH accumulator and which is used for the readout of amounts standing on the LH accumulator and for entering these amounts into the RH accumulator. On the same figure the readout device marked RH to punch readout, represents the readout device on the RH accumulator for reading out the final product and controlling the entry of this final product into the punching section of the machine. On Fig. 24c the switching devices comprising commutators 198, brushes 196 and common current supply strips 199 marked LH—CS, represent a column shift readout device for selectively directing the column shift entry of amounts into the LH accumulator. Similarly on the same sheet the readout mechanism marked RH—CS represents the switching or readout column shift mechanisms for selectively directing the entries into the RH accumulator.

On Fig. 24 of the circuit diagram the readout device designated IVC readout is the readout device associated with the IVC counter, and which readout device is used for directing the amounts into the MC entry retaining device. This IVC readout device is provided with ten segment spots in place of 9. The readout device is utilized for inverting the reading when required to transfer over and effect a subtraction in the MC entry retaining device. The IVC device it will be understood can be used to transfer over the amounts standing on the IVC counter directly or where subtraction is desired the complement of the amount can be transferred over to the MC entry device so that subtraction will be effected.

It will be noted that the wiring of the MC—LH readout device, the IVC device, the MC—RH device, the MP device, the RH to LH devices, the RH to LH punch readout devices includes horizontally extending cross wiring to the segment spots. This is the customary wiring for readout devices of this character. On Fig. 24c the LH—CS and RH—CS readout devices are wired in a different manner. It will be noted that the wiring from segment spot to segment spot comprises sloping wiring connections. By the provision of the sloping wiring connections to the segment spots column shift is effected. If for example, the brushes 196 stand on the units row of spots, entry will be directed into the LH counter magnets in a given relation. However, if the brushes 196 are then moved down to the tens row of spots on commutators 198 the entries will be directed into the counter magnets relatively one column higher for each of the various orders. A similar wiring arrangement is provided on the RH—CS mechanism readout device.

The various counter magnets used in the machine are given the common reference numeral 275 and on the circuit diagram these counter magnets 275 are given supplementary designating reference numerals as follows: 275MC signifies counter magnets pertaining to the MC entry receiving devices, 275IVC are those pertaining to the IVC counter, 275MP those pertaining to the MP receiving devices and 275LH and 275RH those pertaining to the LH and RH accumulators.

*General description of operation of the machine*

General description of the operation of the machine can best be had from a description of the circuit diagram. It will be understood that the circuit diagram, Figs. 24 to 24e inclusive, comprises a composite sheet. In arranging these composite sheets to form one complete diagram, Fig. 24 will appear on the upper left hand corner of the composite sheet followed by Fig. 24a to the right at the top with Fig. 24b at the top to the extreme right. Below Fig. 25b Fig. 24e will be placed, below Fig. 24a Fig. 24d will be placed, and below Fig. 24 Fig. 24c will be placed.

The first operation is to close the main motor switch 300 which will connect the two motors 50 and 160 to the power lines (see Figs. 24b and 24e). It will be understood that with motor 50 in operation the AC generator 52 and its associated DC section 52DC will be in operation. Likewise the AC generator 161 (Fig. 24e) will be in operation.

It may be explained that the machine is adapted to handle computations wherein the multiplicand and multiplier are prepunched on each card and also the machine is adapted to handle computations where the multiplier is a separate card which precedes a group of cards containing successive multiplicands.

The operation will be first explained with the multiplier and multiplicand on each card. When the machine is to be operated with the multiplicand and multipliers prepunched on each card, certain switches are first set. Referring to the circuit diagram a double pole switch embodying blades 301 and 301a is first manipulated to close the contacts at 301 and to close also at 301a. When cards are in the supply hopper the start key 302 is depressed. At this time DC current supply is available on mains 303 and 304. Current flows from 303 via wire 305, through contacts 245 RC now closed, through cam contacts CE back through start key contacts 302 through punch clutch magnet 64, cam contacts PF and back to main 304. Energization of the punch clutch magnet 64 clutches up the shaft 62 in Fig. 4 and causes the card to be fed from the supply magazine 76 into a position in the brush reading station. The presence of a card in the reading station will cause card lever contacts 306 (Fig. 24b) to close energizing coil 307 and closing contacts 308. With the card in the reading station and in position just preparatory to being traversed by the brushes but before the card is actually read, another circuit will be established traced as follows: From AC generator 161 through main 309 (Fig. 24e) via wires 310 and 311 through contacts 245 LA now closed, through cam contacts 261 now closed, through cam contacts CC now closed, through PB, through the zero contacts of the MP readout, through all of the supplemental spots 109a upon the MP readout, supplying current to all of the lines generally designated 312 and also supplying current to line 313, energizing all of the magnets 166 and 167 and thence back by a return circuit lead 314 to the main 315 which leads to the AC generator 161. The energization of the magnets 166 will close all of the 166a contacts and open all of the 166b contacts. A circuit is now established which is traced as follows: From main 309 through 310, through contacts 316 which are now closed via wire 317, serially through all of the 166a contacts, through cam contacts CA now closed, through the magnets 250 which are disposed in the top section of the LH counter and back via wire 314 and main 315 to the AC generator.

The above action will energize the 250 magnets. Energization of one of the 250 magnets will close contacts 245LC (Fig. 24e) and contact 245RA at this time is already closed. Current will accordingly flow from 303 (Fig. 24b) through the three reset magnets 101IVC, 101MP, 101MC, through line 320, through the 245LC contact, through CD, through 245RA and back via wire 321 to main 304. A reset cycle of the IVC counter and of the MP and MC device will now ensue. Reset of the MC device will close cam contacts 255 (Fig. 24b) and allow current to flow through the relay contacts 303 through the stop key 322, through the punch clutch magnet 64, through cam contacts PF and back to main 304. The energization of 64 restarts the card feed to traverse the card past the brushes for reading the amounts therefrom. Just at the end of the first card cycle a circuit will be established from main 303 through switch 301a, through relay coil 323, through cam contacts PA, back to main 304. Energization of 323 closes the points 324b (Fig. 24).

It has been previously explained that coil 307 is energized closing points 308 and also closing points 325 (Fig. 24a). Current supply for the brushes is now established from the AC generator 52 via main 326, through cam contacts PI, through points 325 now closed, via wire 327, through circuit timer 328 to contact roll 80. A plug board 329 is provided for the multiplicand brushes 79 and the usual plug connections connect the brushes to the counter magnets 275MC of the multiplicand entry receiving devices through the contact 245IVCA now closed. Current flows back through line 330, through switch 301 now closed to wire 331 and back to the AC generator. Another plug board 332 is provided for connecting the multiplier brushes 79 to the counter magnets 275MP of the multiplier entry receiving device. Current flows back from these counter magnets through a circuit 333, through contacts 324b now closed to line 331 and the AC generator. As the card passes the brushes 79 the multiplicand and the multiplier are respectively entered into the MC and MP devices.

By the above entering operation the multiplicand is set up on the MC—LH and MC—RH readout device and the multiplier is set up at the MP readout device. The card passes from the card reading station to the next card station adjacent the station generally designated 334 (Fig. 4). The next action of the machine is to set up the cycle controller and column skip mechanism for the cycle controlling action of the machine. This is done in the following manner: which in part is like previous actions but differs in that a multiplier now has been set, whereas previously in starting up the machine there was no multiplier set up but the multiplier readout device stood at zero. Current flows up from AC generator 161, via main 309, wire 310, 311, contacts 245LA now closed, through contacts 261, through cam contacts CC which momentarily close, through PB, through the zero spots of the MP readout devices and through the 312 lines and the line 313 to energize magnet 167 and to also energize such of the magnets 166 which pertain to zero setups of the MP readout device. If significant figures are in the multiplier in all columns none of the 166 magnets will be energized, but if zeros appear in any columns, these magnets will be energized. The energization of 167 initiates the operation of the cycle controller and column selecting mechanism. The brushes 196 of the LH—CS device and the RH—CS devices then move to an extent determined by the position of the first significant figure position in the multiplier. If there is a significant figure in the units order of the multiplier these brushes will move to the units position. If such significant figure is lacking in this position they will move to the higher orders position where a significant figure first occurs. For present purposes it will be assumed that they move to the units position. Similarly an extra brush 196a (Figs. 1a and 24e) moves to the units position on commutator or segment spot device 198a to select the units column for a multiplying computation. With brush 196a at the units position a circuit is established which may be traced as follows: From AC generator 161, through wire 309, through 310, contacts 316 now closed to the cam contacts CB now closed, common conductor segment 199a, units spot of commutator 198a, through the units conductor 340 to the units order conductor strip 109 of the MP readout device, through the units order brush 110 to the spot representative of the digit value of the units order of the multiplier, for example 9, through the ninth bus of the 341 group energizing magnet X9. Current flows back to line 315 via wire 342. Energization of the multiplying relay magnet X9 sets up the contacts in the multiplying panel in the manner previously explained (see Fig. 25). These are contacts 212 and 211. Proper circuits are established to the 216LH lines and the 216RH lines by the multiplying panel device. It will be remembered that the multiplicand has been previously set up on the MC—LH readout devices and the MC—RH readout devices and that the LH—CS and RH—CS switching devices have been set to direct the LH components of partial products and the RH components of partial products into the relatively lowest orders of the LH and RH accumulators. Multiplying emitter 242a is constantly rotating and this emitter receives current over line 342 from the AC generator 161 and emits differentially timed impulses on the group of lines 230. Selected circuits, as stated before, are established to the 216LH and 216RH lines in accordance with the wiring of the nine multiplying panel. Selection of the impulses flowing over these lines is made by the LH and RH readout devices and impulses which are representative of LH and RH partial products are allowed to flow over lines 343 and 344 to the LH—CS and RH—CS column selecting switching devices which direct the entry of these impulses to the counter magnet 275LH and 275RH thereby setting up the first set of partial products on the LH and RH devices. The return circuit from the 275LH and 275RH magnets are via wire 345 back to main 309.

The machine has now multiplied the multiplicand by 9, which is the units digit of the multiplier.

During the multiplying cycle in which impulses were emitted over to the accumulators, a circuit is established as follows: From 309, through 310, 316, wire 317, through 166b pertaining to the units order, through the first spot of commutator 242c (Fig. 24e), via double brush structure 241bc, through the first spot of commutator 242b, through the first magnet of the 166 set and back via lines 314 and 315 to the AC generator 161. The energization of the first magnet 166 will release the column selecting switching mechanism and permit it at a later time in the cycle to advance to the column of the multiplier wherein the next significant figure occurs. The timing of such advance is controlled by cam 179 (Figs. 14 and 15) and the time of advance is shown on the timing diagram (Fig. 28), see the legend "Column Shift Cam". It will be assumed for example, that the second column of the multiplier is a zero and that the third column has a significant digit of 3. Accordingly, the column selecting switching devices LH—CS and RH—CS will be arrested on the hundreds position and likewise brush 196a will move to the hundreds spot.

The next multiplying cycle then ensues, the multiplication in this case being by 3, the X3 magnet is energized and the partial products are directed into the LH and RH accumulators by the column selection switching devices, the entries being made relatively two columns to the left from the previous entries.

Successive multiplying and entering cycles ensue until the multiplication is complete.

It may be explained with reference to Fig. 24e that after the first multiplying computation, the energization of the first magnet 166 will have opened up contacts 166b pertaining to the first position and closed contacts 166a pertaining to that position. The contacts 166b pertaining to the second position will have opened up due to the fact that magnet 166 pertaining to the second position will have been energized due to the presence of a zero in the second column of the multiplier. Likewise contacts 166a pertaining to the second position will have been closed. This will allow current to flow serially through these various contacts 166a until the third position is reached, at which point a circuit is established through 166b to the third spot of the commutator 242c, then upon rotation of the emitter brush 241bc current will flow across to the third spot of the commutator 242b energizing the third position magnet 166. It may be explained that the emitter brush 241bc is arranged to establish contact with line commutator spots of 242b and 242c, at successively higher index point times in successive multiplying cycles, that is the brush 241bc will establish contact with the first linespots at say the one index point in one multiplying cycle and then in the next multiplying cycle it will establish contact with the second line spots at say the two index point position. Accordingly, this timer establishes contact with these various line spots one index point later for each succeeding multiplying cycle.

After the multiplication is complete and all the LH and RH components of partial products have been entered in the LH and RH accumulators, all of the contacts 166a will have been closed and will have been left closed. Thereafter cam contacts CA will close momentarily energizing the two magnets 250LH, current flowing via 317 through all the 166a contacts, cam contacts CA through magnets 250LH and back through 314 to source.

The machine is now ready to transfer LH components of partial products to the RH accumulator. This is effected in the following manner: Through contacts 245RB (Fig. 24c) which at this time are closed, current is accordingly supplied from line 315 to the 242 emitter, and impulses are emitted from this emitter to the LH to RH readout devices. Energization of the magnets 250 will have closed all of the contacts 245L associated with the columns of the RH to LH readout devices and accordingly impulses are permitted to flow over the transfer lines 346 to the counter magnets 275RH of the RH accumulator, thereby entering the accumulation of LH components into the RH accumulator.

It will be noted that the wiring of the transfer lines 346 to the 275RH magnets is such that the entries are directed relatively one column to the left into the accumulator as is customary in the gathering together of RH and LH components of products. Just at the end of the emission of the transfer impulses by the emitter 242 the brush of the emitter encounters an extra spot 347 and allows current to energize magnet 250RH flowing through the 245LB contact back to line 309. Energization of magnet 250RH opens up the contact 245RB. The opening of 245RB (Fig. 24c) serves to prevent the transferring over of a multiplicity of partial product accumulations from the LH receiving device to the RH receiving device. In other words, the emitter 242 makes one emission of impulses and transfers one complete product and thereafter stops its emission of impulses. It may be explained that at the time the 245L contacts are allowed to close by the energization of magnet 250 that contact 245LC (Fig. 24e) closes, allowing current to flow from main 303 (Fig. 24b) through the reset magnets 101IVC, 101MC, 101MP via wire 320, through contacts 245LC now closed (Fig. 24e) cam contacts CD, contacts 245RA now closed, via line 321 and back to other side of DC source 304. The energization of 101IVC, 101MP, 101MC brings about the resetting of the multiplier and multiplicand entry receiving devices. During the foregoing reset cycle cam contacts 255 close. If the first card is being handled contacts 308 will be closed and card lever contacts 348 will not be closed. If two or more cards are remaining in the machine, contacts 308 will be closed and 348 will also be closed. If, however, there is only one card remaining, 308 will be open and 348 will be closed. Irrespective of which of these conditions exist, the closure of either 308 or 348 or both of them, will permit current to flow from line 303 past the cam contacts 255, through the stop key contact 322 to punch clutch magnet 64 and through cam contacts PF back to line 304. Energization of 64 will bring the punching section of the machine into operation.

While the operation of the punching machine proceeds, the emitter 152 will come into action to emit impulses in synchronism with the travel of the crosshead in the punching section of the machine. Current supply to the emitter 152 (Fig. 24) is provided in the following manner. From line 326 via wire 349, relay points 350 now closed, through cam contacts PD closed at the proper time in the cycle to emitter 152. This emitter then operates synchronously with the movement of the crosshead of the punching section of the machine to emit impulses over a set of lines 351 to the RH to punch readout devices. From these readout devices impulses are allowed to flow over lines 352 in accordance with the product which is set up on the readout device. Lines 352 extend to a plug board 353 at which point plug connections are made to the punch selector magnets 131 (Fig. 24b). A return circuit from the punch selector magnets is provided via line 354. Punching operation ensues and the product is punched on the card from which the factors were derived.

The machine is now ready to reset the LH and RH accumulators preparatory to their receiving a new accumulation of partial products from a succeeding card. At the proper time in the cycle, cam contacts PE close (Fig. 24b), establishing a circuit through 303, via wire 355 to the reset magnets 101 of the RH and LH accumulators back through wire 356 to wire 321 and to the other side of the DC source 304. Energization of 101 brings about the resetting operation as previously explained.

The circuits for combining the two accumulators may be here explained. These devices which embody contacts 258 and controlling magnets 259, are in a circuit from 303, via 305 and branch 359 to magnets 259, thence through contacts 258 and back through 356 and 321 to the other side of the line 304.

As shown on Fig. 24b latch 358 is provided for latching the stop key down with its contacts open when the stop key is depressed. Provision is made for releasing this latch upon actuation of the start key 302. The start key is arranged to depress the latch and release the stop key. No details of this particular arrangement of stop and start keys are here shown other than the latch 358, since it will be readily understood that the stop key 302 can be placed in position to trip latch 358. The reason for providing the latch 358 is to hold the stop circuit open after the operator releases the stop key, since in a machine of this class several cycles may be required to complete the multiplying computation.

When cards are exhausted from the supply magazine and all punching operations and results have been completed the machine stops automatically. This is brought about in the following manner: Upon exhaustion of the cards in the machine, card lever contacts 306 will open de-energizing 307 and opening up contacts 308. Card lever contacts 348 will likewise open up. The opening up of contacts 308 and 348 will leave the circuit from 303 to the punch magnet 64 open so that upon closure of the cam contacts 255 a new punching operation will not be initiated. Punching operations will thereupon stop. When the machine operation terminates in this manner the punching section of the machine is at rest and contacts PE do not reclose, accordingly, no circuit is established to reset magnets 101 and accordingly the LH and RH accumulators are not reset. Due to the fact that these accumulators are not reset, the contact 245RC is left closed. It will be remembered that this contact 245RC would have been reopened if the RH accumulator had been reset. With this 245RC contact closed restarting of the machine can be effected by depression of the start key through the circuit previously traced. However, if the supply of cards remains in the card magazine a different action namely a permitted continued operation of the machine, would ensue and the 245RC contact would be latched open at the end of the reset operation.

The purpose of this 245RC contact under these conditions is to prevent the operator inadvertently setting the punching section of the machine in operation during the middle of the punching cycle by inadvertent depression of the start key 302.

When the machine is stopped by the depression of the stop key, the circuit to the punch clutch magnet 64 is interrupted just as if cards had been exhausted from the machine. The stop key is, however, latched in open position and as explained before if the machine is restarted after depression of the stop key this is done by pressing the start key which unlatches the stop key allowing its contacts to close. The reclosure of these stop key contacts, however, does not initiate a new operation of the machine but this is effected through the usual start key circuit.

*Running the machine with special card control*

In some cases it may be desirable not to punch both the multiplier and multiplicand on each and every card but to punch the multiplier on a master card which precedes a group of cards punched with multiplicand amounts. This is effected by placing a special multiplier card in the run of cards before each group, this special multiplier card being in the nature of the usual stop card with a notched out corner. When the machine is to be operated in this manner, the switches 301 and 301a are thrown to open position. Under these conditions of operation when the master or control card is fed under card lever 360 (Fig. 24b) the notched out corner of this card leaves contacts 361 closed, due to the cooperation of the card lever with the notched out portion of the card. This allows a circuit to be completed through relay coil 323 closing relay points 324b upon the closure of cam contacts PA just before the D position (see Fig. 28). A stick circuit is thereupon established through the relay points 324. The energization of relay coil 323 has also closed contacts 324b (Fig. 24) and the closure of these contacts completes a circuit to the 275MP magnets so that the multiplier amount can be read from the master card. Under these conditions of operation contacts 324a are open. This cuts off the circuit to the 275MC magnets and thus prevents any multiplicand factor from being read in from the multiplier master card. In this way the fields of the master card can be perforated with other group designating data in the columns which would enter ultimately into the multiplicand entry receiving device. In fact the opening of the 324a contacts prevents the reading of anything but the multiplier factor from the multiplier field of the master card such entry being permitted by the closure of contacts 324b under control of the master card with switch 301a open. With the usual detail cards passing through the machine following the master card, the relay 323 would not be energized consequently amounts from the field of the detail cards corresponding to the multiplier field of the master card will not be entered into the MP receiving device.

To obtain such entry when running with no master cards, but with detail cards only, the circuit to the 275MP magnets is established by closing switch 301a (Fig. 24b), which permits energization of relay coil 323 and closure of the contacts 324b. Accordingly, in the present machine, provision is made for altering the entering operations under master card control. Provision is made for suppressing the reading of data from the special master card from fields other than the allotted multiplier field and also when running with master cards provision is made for suppressing the entry of amounts from the field of the detail cards which corresponds to the multiplier field of the master card. With master card operations the multiplier factor of a given computation is taken from the master card alone and the multiplicand amount is taken from each detail card. With the foregoing master card operation, the master card will proceed on through the punching section of the machine and provision should be made for preventing the punching of zeros in the master card in the fields of this card which would be in a position to receive a product if a computing operation was effected from this card. In effect the passage of a master card through the machine produces a multiplication of the multiplier factor from the master card by zero and accordingly the result would be zero and unless means were provided to prevent it zeros would be punched back on the master card. The preventing of the punching of these undesired zeros on the master card is provided by means of a card lever 362 disposed in the intermediate station 334 (Fig. 3). When the master card comes into the station, the card lever contacts 363 are left closed due to the notched out corner of the master card. Cam contacts PH upon closure energize 350a closing relay points 364 and establishing a stick circuit through 350a and the energization of 350a opens up contacts 350 (Fig. 24) and prevents current being supplied to the emitter 152 which effects the punching. In this way punching of unnecessary undesired zeros on the master card is suppressed.

It will be understood that with ordinary cards not having notched out corners therein passing through the machine, that card levers 360 and 362 will function in a different manner, that is, both contacts 360 and 362 will be open during the transit of the usual cards through the machine.

With the multiplication factor derived from the master card it will be appreciated that provision must be made for preventing the resetting of the MP device until a new master card comes along. This is effected in the following manner: With switch 301a open the only way that reset of the MP device can be effected is by energization of 101MP through a circuit which does not include switch 301a. 101MP only receives current when the master card passes the card lever 360, thus there will be energization of 101MP for each passing master card, but there will be no energization of 101MP when the regular multiplicand cards pass through the machine, because these cards do not cause closure of contacts 361. A regular multiplicand card passing through the machine would so act on the card lever 360 as to open up contacts 361. However, upon a master card passing through the machine the passage of the master card past 360 would allow contacts 361 to close.

*Inverter counter operation*

In some cases it may be desirable to add two component readings derived from the card together to obtain a multiplicand. In other cases it may be desired that these readings be subtracted one from another and the result used as the multiplicand. The adding or subtraction of multiplicand factors is effected by means of the inverter counter. Broadly the subject matter is disclosed and claimed in Bryce and Daly application, Serial No. 423,000, filed January 24, 1930, but the present construction differs in that an inverting counter is used instead of translating analyzers.

In the handling of amounts involving addition and subtraction, one of the components of the multiplicand is read directly into the multiplicand counter receiving device, the other component portion of the reading is read directly into the inverting counter, plug connections being provided at 363 for this purpose. Disposed in the machine are switches 364a, 365 and 365a. In actual construction these switches comprise a triple pole switch, but for simplicity in the wiring diagram they are shown as independent switches. When two multiplicand components are to be added together, switches 365, 364a and 365a are thrown to the upper or adding position. With switch 365 in upper position at the proper time in the cycle of operation of the machine, magnet 250IVC will be energized closing contacts 245IVCb and opening contacts 245IVCa of the IVC readout mechanism. Also at the proper time in the operation of the machine, cam contacts PG will close establishing a circuit to the adding emitter 150 which emitter at the proper time in the cycle emits impulses through the IVC readout devices, through the 245IVCb contacts now closed and through the set of lines generally designated 366, to the 275MC counter magnets. In this way the two factors derived from a single card are set up on the MC counter, the factors being added together.

In the timing of the operation of the machine there is an available cycle in which amounts can be entered into the 275MC counter after this counter has received its amounts direct from the card. See Fig. 28, noting the adding emitter timing as shown by the solid black spots. In the operation of the machine contacts PG open after one emission of impulses by the adding emitter 150 and thus prevent repeated addition of the amount into the MC counter.

When it is desired to subtract the two factors from the same card one from the other and utilize the subtracted amount as the multiplicand, the switches 364a, 365 and 365a are thrown to reverse position. With 365 in lower position the contact operation of the 245IVCa and 245IVCb contacts is the same as before, but switch 364a establishes current supply through cam contacts PG to a subtracting emitter 151. It will be noted that the subtracting emitter 151 is wired up to the IVC readout device in a complementary manner so that in place of there being an emission of the amounts standing on the IVC counter and the entry of this amount into the 275MC device there will be a transfer over of the complement standing on the IVC devices and the entry of this complementary amount into the 275MC device. This emission of complementary amounts is provided by the relation of the wiring of the emitter 151 to the readout devices, the wiring being disposed in a complementary manner as shown. The wiring of the 151 subtracting emitter to the IVC readout device is such that in the units order the emission of impulses is complemented to 10 and in the remaining and lower orders the reading is complemented to 9.

In connection with the circuit diagram it may be explained that all of the wiring shown on Figs. 24, 24a and 24b and the various controls, etc. are in the card reading section of the machine, whereas all of the wiring on other parts of the lower three figures, Figs. 24c to 24e, inclusive, are in the computing section of the machine. Preferably in the actual construction of the machine the sets of wires 343, 216LH, 351, 216RH, 344, 340, 313, 312, 315 and the wires 355, 320, the wires 367 to the start key 302 and wire 321, wire 305 and connecting wires between the two motors 50 and 160 are placed in a single cable 368, this cable being shown in Figs. 1 and 1a. In practice preferably the cable 68 would be provided with a plug connection to permit the physical separation of the machines. Furthermore, by providing for the separation of the machines in this manner, the punching machine and card reading section can be used for other purposes independent of the computing which is effected in the computing section of the machine. Preferably plug receptacles would be disposed in the card reading and punching section of the machine.

*General statement of operation*

In general the machine can be stated to operate as follows: The operator first plugs the machine up to read the factors from the proper fields of the card and properly enter them into the entry retaining mechanisms of the machine and also plugs up the proper lines for punching the products on the records in the field where product punching is desired. The operator then determines whether two components of a multiplicand are to be added together or to be subtracted or whether a single multiplicand factor only is being dealt with. According to this determination switches 364a, 365 and 365a are set either to the add or subtract position or to the neutral position. The operator further determines whether the machine is to be set for master card control, in which case the multiplier factor is to be read from a master card and the multiplicand factors from the individual cards or whether both factors are to be derived from each of the ordinary record cards. According to this determination the operator sets switches 301a and 301.

For present explanation it will be assumed that the machine is being run straight, that is no addition or subtraction is being performed and that the factor data is being derived from each card. Cards are then placed in the supply hopper of the machine and the start key is depressed. A card feed now ensues of the first card in the stack. This card is advanced and eventually passes under the set of brushes causing the factor reading from the card to be set into the MC and MP receiving devices of the machine. The machine now suspends operation on the card handling end and a computing operation is initiated in the second or computing section of the machine. Control of the initiation of this computing action comes from the first section, that is when the first section has received its entry and is ready to control the operation of the second or computing section the first section of the machine tells, as it were, the second section to begin operations. The cycle controller in the second section now becomes set. It senses the multiplier set up on the MP device in the first section and determines how many significant figures there are in the multiplier and what their denominational position is and where the zeros are located if any such zeros are present. This cycle controller then immediately sets its switching mechanism in accordance with the information received from the MP receiving device in the first section. Thereafter there is an effect by the emission of impulses from an emitter in the second section. The impulses from this emitter flowing through the circuits established by the multiplying relays or panels and these impulses flow to the multiplicand entry receiving device in the first section and there certain selections are made. The selected impulses which are permitted to flow then flow back to the second section and control the entry of a partial product into the LH and RH accumulators. This multiplying process is repeated under the control of the cycle controller and column shift mechanism. Proper entry of amounts into the LH and RH accumulators is directed in each instance by the column shift mechanism which in turn is under the control of the cycle controller. After the multiplication is complete a control circuit is established in the second section which initiates a transferring over cycle of operations to transfer the reading standing on the LH accumulator into the RH accumulator to get the final product. The actual transfer over is effected by an emitter in the second section which emits impulses through the readout device on the LH accumulator into the counter magnets of the RH accumulator. Upon completion of this transferring over operation the computation is complete in the second section and the second section signals to the first section that this condition has been reached. The first section upon receiving this signal then sets its own emitter into action, this emitter emitting impulses over to the RH readout mechanism, which RH readout mechanism selects the impulses permitting the desired impulses to flow through lines back to the punch mechanism in the first section. The punch selectors are now set and a punching operation ensues in the first section. This punching operation punches back the product on the record card from which the original factor data was derived. After the punching operation is complete the card is fed into a discharge hopper and a new card starts through the machine and follows the cycle previously traced.

If the machine is intended for master card control the switches are manipulated as previously set forth and in this case the multiplier factor will be taken from the master card and multiplied by the multiplicand factor taken from ordinary record cards. The product will be punched back on the ordinary record card as before. No punching will, however, be made on the master card nor will a reading be taken from fields of the master card other than those which are allocated for the multiplier.

When adding or subtracting of multiplicand components is to be effected, the switches are set accordingly, and the operation is the same as before except that there will be a dual reading from each card of the multiplicand and these dual readings will be either added together or subtracted one from the other before multiplication is effected.

Various forms of relay devices are used in the present machine. Some of the relays are purely electrical relays such as the relays of the type with coil 350a and contacts 350 (see Fig. 24). Other relays are of the electromagnetically tripped but mechanically controlled and restored multi-contact type. Such relays are those heretofore called "multiplier panel relays" which are used for multiplier selection purposes and are such as are shown in Figs. 12, 13, 17, 17a, 17b and 17c. Other relays of the general type shown in Fig. 21 with coils 250 and contacts 245 are of the electromagnetically tripped and mechanically restored and re-latched type.

What we claim is:

1. A record controlled calculating machine which is adapted to multiply factor data derived from records, said machine having means for handling a series of records arranged in groups and passing the records in succession through the machine, each of said groups of records being separated by distinctive master cards, each master card having an identifying characteristic to show that it is a master card, means for sensing the cards to determine whether or not a passing card is a master card by sensing said identifying characteristic, means controlled by the last mentioned means for reading from each master card a factor of the to be performed computation, and means for multiplying such factor by another factor derived from each of the succeeding cards in succession.

2. The invention set forth in claim 1 in which means are provided for the suppressing of the entry of undesired data from the master cards.

3. The invention set forth in claim 1 in which punching means are provided to punch results on the card and in which means are provided for preventing the punching of the master cards.

4. A machine according to claim 1 wherein settable supplemental control means are provided to control whether the machine is to derive both factors from each single record or to derive one factor from one record and another factor from another record.

5. An electro-mechanical relay including a magnet and an armature therefor with latching means for the armature and power means for relieving the load upon the latch prior to the tripping of the same by the magnet.

6. In an accounting machine including a differential controlling mechanism including a member, means for controlling said mechanism to provide a forwardly advancing movement of differential magnitude for the member thereof, said means including means effective during a single cycle of operation of said member for differentially initiating advance of said member and means for differentially terminating movement of said member and effective during said same cycle of operation.

7. A differential mechanism including a driving member having a constant excursion of movement per cycle, a settable member, means effective during a given cycle of movement of the driving member for coupling the same selectively to said driving member at any one of a plurality of points, and means effective during the same cycle of movement of the driving member for uncoupling the settable member from the driving member at any one of a plurality of points in the movement of the driving member.

8. An electrically controlled multiplying machine, including a plurality of mechanically interchangeable electro-mechanical multiplying relays, each forming a multiplying panel and each comprising a removable mounting plate which carries both a contact assembly and a tripping magnet which controls the contact operation, and means on each relay panel for receiving selective wiring connections for establishing circuit relations to the contacts of the relay according to the value of the multiplying panel.

9. A record controlled multiplying machine including means for feeding in succession a plurality of groups of cards through the machine, each group containing one or more cards and the several groups being each headed by a special card having a special characteristic and containing a representation of one of the factors of the computation to be effected by the machine and each of the following cards in a group containing a representation of the other factor of the computation, means for receiving from the card with the special characteristic the factor which it contains, means for receiving the other factor from the following card, record controlled means to control the last two mentioned receiving operations, means for multiplying such received factors, means causing the retention in the receiving means of the factor entered from the special card with the special characteristic whereby such retained factor may be multiplied by each of the other factors derived from each of the following cards, and means automatically operated under the control of the next special card with its special characteristic for clearing out the previously retained factor so that the receiving means of the machine can receive a new factor from the following special card which factor is to be retained for one or more succeeding multiplying operations.

10. The invention set forth in claim 9 in which means is provided for automatically suppressing in cards lacking a special characteristic the entry of amounts from the field corresponding to that from which the factor data was derived from the special card having a special characteristic.

11. A record controlled accounting machine with card handling devices for passing detail cards and special master cards through the machine, means for reading amounts from said cards, amount manifesting means for the amounts so read, multiplying means for multiplying manifested factor amounts, and sensing means controlled by the master or detail card and upon the reading of a special master card or detail card for controlling the entering operation so that one factor amount only is entered from the master card and so that another factor amount only is entered from the detail cards.

12. A record controlled accounting machine with card handling devices for passing detail cards and special master cards through the machine, means for reading amounts from said cards, amount manifesting means for amounts so read, means for sensing the presence of a special master card, multiplying means for multiplying manifested factor amounts and for setting up the results thereof, recording means for recording such results upon the record from which the data has been read, means controlled by the aforesaid special sensing means and upon the reading of a special master card for suppressing an undesired recording operation upon such master card.

13. A record controlled accounting machine with card handling devices for passing detail cards and special master cards through the machine, means for reading the multiplicand and multiplier from said cards, and means receiving the readings, said last-mentioned means including entry receiving devices for receiving entries of the multiplicand and of the multiplier, resetting means for the multiplier entry receiving device, means normally tending to cause a resetting operation of the multiplier entry receiving device once for each card which is handled and read, multiplying means for multiplying entered multiplicand and multiplier amounts and for setting up the result thereof, and means controlled upon the reading of a special master card and by the card for controlling the resetting operation of the multiplier entry receiving means so that said means becomes reset upon the entry of a new master card and prior to the reading of an amount therefrom, the aforesaid means also being effective to suppress resetting of the multiplier entry receiving means upon the reading of detail cards.

14. A record controlled accounting machine with card handling devices for passing detail cards and master cards having a special designating characteristic thereon through the machine, means for reading multipliers and multiplicands from said cards, entry receiving devices for the multiplicand and the multiplier, resetting devices for the multiplicand entry receiving device, resetting devices for the multiplier entry receiving device, multiplying means for multiplying entered multiplicand and multiplier factors set up upon the aforesaid entry receiving devices, means for sensing the presence of a detail or a special master card and means controlled by said last mentioned means for controlling entry of amounts into the multiplicand and multiplier entry receiving devices from the amount reading means so that the multiplier factor is entered from the master card with no entry of a multiplier amount from the following detail cards and so that the multiplicand amount is entered from the detail cards only with no amount entering the multiplicand entry receiving device from the master card, the aforesaid detail and master card sensing means being also adapted to control the time of the reset of the multiplier entry receiving device so that the multiplier entry receiving device fails to reset following the reading of a special master card and during the sensing of detail cards and becomes reset when another master card is sensed whereby each multiplicand factor read from each following detail card may be multiplied by the common multiplier factor read from the master card.

15. A multiplying machine including a plurality of receiving devices for entered terms A, B and C, means to transfer the A term from the A receiving device to the B receiving device, multiplying means controlled by the C term multiplier factor receiving device and by the B receiving device for multiplying the amount in B which includes the amount transferred from the A device and which amount in B constitutes the multiplicand by the C term, the aforesaid transferring means including controlling means comprising a readout associated with the A term receiving device and means for emitting impulses through said readout device to the B term receiving device.

16. The invention set forth in claim 15 in which the impulse emitting means comprises a pair of impulse emitters, one for emitting impulses in regular order and the other for emitting impulses in a reversed or complemental order and including common bus bar connections to the readout receiving certain of either set of impulses.

17. A multiplying machine of the type which reads the terms of a to be performed computation from a record, algebraically adds two of the terms to form the multiplicand and multiplies such multiplicand by a third term read from the record, said algebraic adding means including entry receiving devices for the entered terms, a readout device associated with one of the entry receiving devices for controlling entries into the other device and selectively effective impulse emitting means for reading out from the entry device, having the readout device associated therewith, through the aforesaid readout device either the complement of the number or the number standing thereon for algebraic addition with the number on the other entry receiving device.

18. A differential mechanism including a driven member having a constant excursion of movement per cycle, a settable member, means including an electrical control for coupling the same selectively to said driven member at any one of a plurality of points, and means including an electrical control for uncoupling the settable member from the driven member at any one of a plurality of points in the movement of the driven member, said last two mentioned means being both effective during a single cycle of operation of the settable member and during a single cycle of operation of the driven member.

19. In an accounting machine including a differential controlling mechanism including a member, means for controlling said mechanism to provide a forwardly advancing movement of differential magnitude for the member thereof, said means including a clutching means and means for differentially initiating clutching action for differentially initiating advance of said member, and means for differentially initiating declutching action for differentially terminating movement of said member, said clutching and de-clutching initiating means being both effective during a single cycle of operation of the aforesaid member.

20. The invention set forth in claim 9 in which control means is provided for rendering the special card control effective or ineffective so that the machine may be selectively operated to derive one factor from one card and the other factor from the following card or to derive both factors of a to be performed computation from each and every individual card.

21. An accounting machine with an accumulator upon which an amount may be entered for algebraic addition with another amount, a device upon which a multi-denominational amount may be set up, a readout associated with said last mentioned device and having outgoing lines leading to various columnar orders of the aforesaid accumulator, and input lines which are common to a plurality of columnar orders of the readout and selectively effective impulse emitting means for emitting impulses to said input lines and through the readout device, said impulses being representative either of the setup amount or its complement for algebraically adding the setup amount with the amount in said accumulator.

22. An accounting machine comprising two accumulators, means for separately entering amounts from separate fields of a record into each of the foregoing accumulators, a readout device associated with one of the accumulators and means including impulse emission controlling means for emitting impulses through the readout device for algebraically adding the amount in one accumulator with the amount standing in the other accumulator either additively or subtractively.

23. An accounting machine comprising two accumulators, means for separately entering amounts from separate fields of a record concurrently into each of the foregoing accumulators, a readout device associated with one of the accumulators, and means for emitting impulses through the readout device for algebraically adding the amount in one accumulator with the amount standing in the other accumulator subtractively.

24. An accounting machine comprising two accumulators, a readout device associated with one accumulator with outgoing lines leading to the other accumulator and input lines common to a plurality of columnar orders of the readout device, and selectively operable means for controlling the impressing of either straight or complemental impulses upon said input lines whereby an amount standing in one accumulator may be added to or subtracted from an amount standing in the other accumulator.

25. An accounting machine including a readout device settable according to an entered multi-denominational amount, an accumulator into which amounts may be directly entered from the foregoing readout, and means for directing complemental impulses through said readout from a single impulse emitter and for controlling impulse flow so that tens complementary impulses flow to the lowest order of the readout and nines complementary impulses flow to the remaining relatively higher orders.

26. An accounting machine including an impulse emitter, an accumulator, a readout separate from the impulse emitter and through which impulses flow to the accumulator, said readout having special wiring differently connecting the lowest and relatively higher orders of the readout to the emitter so that the lowest order is complemented to ten and the relatively higher orders are complemented to nine when an emission of impulses is made through the readout to the accumulator.

27. A record card controlled accounting machine including a perforating section and a card handling section, computing means for controlling multiplying computations including means for deriving a multiplier factor from a rate card having a special characteristic which precedes a group of detail cards containing other factor data, means for deriving said other data to be computed from said detail cards, means for perforating by the perforating section the computed results, sensing means to sense rate cards for their special characteristics, and means controlled by the last mentioned means for suppressing the punching of undesired zeros upon said rate cards by said punching section.

28. A record controlled accounting machine including multiplying devices, entry receiving devices for the multiplicand and multiplier for controlling said multiplying devices, means for entering multiplicand data into said multiplicand receiving devices from detail cards, selectively operable control means for controlling the entering of multiplier data into the multiplier receiving device from said detail cards or from rate cards, and means operative when the multiplier receiving device is receiving data from rate cards under the control of the last mentioned means for suppressing the receipt of such multiplier data from multiplier fields of the detail cards.

29. A record controlled accounting machine including multiplying devices, multiplicand and multiplier entry receiving devices for controlling said multiplying devices, control means controlling entries into the multiplier receiving device, means for controlling the control means automatically during machine operations so that the multiplier receiving device receives its entry only from rate cards and does not receive entries from multiplicand detail cards and means effective and controlled by the foregoing means upon rate card operations for preventing the entry of data from the rate cards into the multiplicand entry receiving device.

30. In an accounting machine including a differential controlling mechanism including a member, means for controlling said mechanism to provide a forwardly advancing movement of differential magnitude for the member thereof, said means including means for differentially initiating advance of said member and a cycle controller controlled by the aforesaid differential controlling mechanism for controlling the cycle of operation of the accounting machine and for omitting unnecessary computing cycles.

31. In an accounting machine including a differential controlling mechanism including a member, means for controlling said mechanism to provide a forwardly advancing movement of differential magnitude for the member thereof, said means including means for differentially initiating advance of said member and for differentially terminating movement of said member, said machine having a switching mechanism for column shift purpose, which switching mechanism is positioned by and in accordance with the differential position of the member of the differential mechanism.

32. In an accounting machine including a differential controlling mechanism including a member, means for controlling said mechanism to provide a forwardly advancing movement of differential magnitude for the member thereof, said means including means for differentially initiating advance of said member and for differentially terminating movement of said member, said machine also including a switch mechanism which is set by the aforesaid member of the differential mechanism to an extent which accords with the denominational order value of a significant digit of a multiplier factor, said switching mechanism supplying current for a digital reading of the determined denomination.

33. In an accounting machine including a differential controlling mechanism including a rotatable calculation controlling member, means for controlling said mechanism to provide a forwardly advancing movement of differential magnitude for the member thereof, said means including means for differentially initiating rotational advance of said member and for differentially terminating rotational movement of said member, said last mentioned initiating and terminating means and the control means for the differential mechanism comprising a plurality of electromagnets which by selective energization and de-energization determine the extent of rotational motion of the differential member.

34. The invention set forth in claim 27 in which the means for suppressing the punching of undesired zeros upon rate cards comprises a record controlled means which is differently controlled by a rate card and a detail card whereby punching may be permitted upon a detail card and suppressed upon a rate card.

35. A record controlled accounting machine with multiplying devices, means for controlling their operation, comprising a record controlled receiving means for a multiplier factor and a pair of record controlled receiving means for multiplicand components one of which comprises the multiplicand factor receiving means, means including record controlled means to cause the multiplier factor to be derived from a rate card and the multiplicand component data to be derived from following multiplicand cards, and means to cause the transfer of the multiplicand component from its receiving means to the multiplicand factor receiving means whereby the multiplicand is set up in said last mentioned receiving means and associated selective means cooperating with said last mentioned means whereby either the sum or difference of multiplicand component data may be obtained.

36. A record controlled accounting machine with means for reading two terms such as A and B from a detail record, receiving means for such terms A and B, means to transfer amounts from the A term receiving means to the B term receiving means, means for reading a third C term which is a multiplier factor from a special master card which precedes a group of detail cards, receiving, means for the multiplier factor, multiplying means controlled by the B and C term receiving means for multiplying the multiplicand amount in the B term receiving means, which amount includes the amount transferred from A, by the C term, means automatically effective under control of such special card for controlling the entry of the A, B and C terms and for also causing said C term multiplier factor to be retained in the C term receiving means for subsequent multiplication with the multiplicand obtained from the A and B terms derived from each of the following detail cards.

37. A machine according to claim 36, including control means for the amount transferring means to determine whether the transferred amount is to be transferred negatively or positively whereby the A and B terms can be algebraically added.

38. A machine according to claim 15, including control means for the transfer means to determine whether the transferred amount is to be transferred negatively or positively whereby the A and B terms can be algebraically added.

39. In a record controlled accounting machine with factor receiving means and multiplying means controlled thereby for multiplying the factors, the combination including a supplemental record controlled receiving means which, with the multiplicand factor receiving means, receives multiplicand components from record cards, means to transfer amounts from the supplemental receiving means to the multiplicand receiving means whereby the multiplicand factor is set up thereon, control means for said transfer means, selectively operable control means for controlling entries into the multiplier factor receiving means so that the multiplier may be derived from a rate card only or from cards which contain both the multiplicand and multiplier, means controlled by the last mentioned means for controlling the multiplicand component entries, and means for optionally setting the control means for the transferring means whereby the sum or difference of the multiplicand components may be obtained.

40. In an accounting machine of the record controlled type, with record reading means, factor receiving means for the multiplier and multiplicand adapted to receive entries under control of the reading means, multiplying means controlled thereby having result receiving means, including in combination, means including entry control means, means for controlling the control means automatically during card handling operations to cause the factor receiving means for the multiplier factor to receive such factor only from a rate card, said control including means to cause the multiplier factor to be retained in its receiving means for subsequent control of the multiplying means, the aforesaid entry control including means controlled thereby to cause the other factor to be entered in its receiving means from detail cards, such entries being used during multiplying computation by the multiplying means, punching mechanism controlled by the result receiving means for punching the result of the computation, and means for suppressing undesired punching operations by the punching means upon rate cards.

41. The invention set forth in claim 40 in which the means for suppressing the punching operations is rate card controlled.

42. The invention set forth in claim 40 in which the means for suppressing the punching operations is rate card controlled and which means comprises a sensing means which is differently controlled upon the sensing of a rate card and a detail card whereby suppressing of punching is effected on detail cards and punching is permitted upon detail cards.

43. A record controlled accounting machine with means for reading components of a calculation, including a multiplier factor from a card, each component being always read as a true number, computing means including means receiving the components and the multiplier factor under the control of the reading means, component transferring means to transfer one component from one receiving means to another component receiving means, multiplying means controlled by said last mentioned receiving means and by the multiplier factor receiving means, a perforating apparatus for perforating results of computing operations upon the card from which the components were derived, means to cause the component transfer means of the computing means to effect either an addition or subtraction of the true number components, said last named means including settable means which may be set for causing either adding or subtracting of the components and control means to call the multiplying means into operation after component transfer means have been completed whereby the ring operations have been completed whereby the sum or difference may be multiplied by the multiplier for recording by the perforating means upon the record card.

44. A record controlled calculating machine with means for handling records, means for deriving data from said records, amount manifesting means controlled by the deriving means, multiplying means controlled by the manifesting means for multiplying such data, said machine including cooperating entry control means, sensing means for detecting records bearing a distinctive characteristic and regular records, said sensing means controlling the last mentioned means, and means adapted to be preset and left undisturbed in one status during a run whereupon the control means is brought to one status by the sensing means sensing a record with a distinctive characteristic and to a different status upon the sensing means sensing a regular record, said control when in said one status causing the multiplier factor to be derived from one record and when in a different status causing the multiplicand factor to be derived from a second or following record, whereby multiplication of two factors derived from two separate records may be effected when a following record is preceded by a record bearing an identifying characteristic, said pre-settable means upon being differently pre-set modifying the operation of the control means and changing the entry relations whereby both factors are derived from a single record.

45. A record controlled accounting machine, including record reading means, multiplier and multiplicand factor manifesting means controlled therefrom, multiplying devices controlled by said last mentioned means, reset means for the multiplier manifesting means, entry control means and cooperating control means for the entry control means and for the aforesaid reset means, means for controlling the cooperating control means automatically during card handling operations for connecting the record reading means with the factor manifesting means and for also suppressing reset of the factor manifesting means for the multiplier factor whereby the multiplier factor is automatically derived from one of a series of cards and retained in the factor manifesting means therefor and whereby the other factor is automatically derived from each card of a succeeding series of cards which follow the card from which the first mentioned factor is derived, and a pre-settable switching means, which when differently set adapts the cooperating control means for a different operation wherein both factors are automatically derived from a single card and wherein the cooperating control means is modified in its operation and reset of the multiplier factor manifesting means permitted for each card.

46. Control means for a record controlled multiplying machine for selectively adapting the machine for wholly automatic rate card operations in which the multiplier factor is derived automatically only from rate cards in a common run of cards and in which the multiplicand factor is automatically derived only from detail cards in such common run or for adapting the machine for normal multiplying operations in which both factors are automatically derived from each card in the common run of cards, the multiplying machine comprising record controlled receiving means for the multiplier and multiplicand factors and multiplying means controlled by the aforesaid receiving means; said control means comprising in combination, pre-settable means settable for one operating condition or the other, record sensing means to detect the difference between rate cards having a distinguishing characteristic and detail cards lacking such characteristic, entry controlling means under the control of the sensing means when the pre-settable means is set for rate card operations to cause the multiplier receiving means to receive amounts automatically only from rate cards in a common run of cards and to cause the multplicand receiving means to receive its amounts only from detail cards in such common run, and means under control of the pre-settable means when the same is set for normal multiplying operations to cause the receiving means for both the multiplier and multiplicand factors to derive automatically for all cards in a run their respective factors from each card in the run.

47. The machine according to claim 46 wherein reset control means for the multiplier receiving means is provided and including means for controlling the reset control means under the control of the sensing means when the pre-settable means is set for rate card operations so that the multiplier receiving means retains the multiplier amount derived from a rate card for succeeding calculations with multiplicand data derived from detail cards, and also including means effective when the pre-settable means is set for normal multiplying operations to cause the reset controlling means to bring about multiplier reset automatically for each card.

48. The machine according to claim 46 in which the control means includes means effective upon rate card operations to suppress the possible entries of data from the detail cards into the multiplier receiving means and to also suppress the possible entry of data from the rate cards into the multiplicand receiving means.

JAMES W. BRYCE.
GEORGE F. DALY.
JAMES M. CUNNINGHAM.